US010755591B2

(12) United States Patent
Correia Gracio et al.

(10) Patent No.: US 10,755,591 B2
(45) Date of Patent: Aug. 25, 2020

(54) ELECTRONIC DEVICE AND METHOD FOR DEBRIEFING EVIDENCE-BASED TRAINING SESSIONS

(71) Applicant: The Boeing Company, Chicago, IL (US)

(72) Inventors: Bruno Jorge Correia Gracio, Madrid (ES); Lars Fucke, Madrid (ES); Martyn Townsend-Smith, Surrey (GB); William Brett Martin, Madrid (ES)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 15/803,233

(22) Filed: Nov. 3, 2017

(65) Prior Publication Data

US 2018/0165979 A1    Jun. 14, 2018

(30) Foreign Application Priority Data

Dec. 9, 2016  (EP) .................................... 16382593

(51) Int. Cl.
*G09B 5/06* (2006.01)
*G06Q 10/06* (2012.01)
(Continued)

(52) U.S. Cl.
CPC ............... *G09B 5/065* (2013.01); *G06N 5/02* (2013.01); *G06Q 10/06398* (2013.01);
(Continued)

(58) Field of Classification Search
CPC . G09B 5/00; G09B 5/065; G09B 9/08; G09B 19/165; G06N 5/02; G06Q 10/06; G06Q 10/06398
See application file for complete search history.

(56) References Cited

U.S. PATENT DOCUMENTS 8,180,662 B2  5/2012  Minert et al.
9,022,786 B2  5/2015  Fabling
(Continued)

OTHER PUBLICATIONS

Gracio et al., "Electronic Device and Method for Debriefing Evidence-Based Training Sessions," European Patent Application No. 16382593. 8, filed Dec. 9, 2016, 26 pages.
(Continued)

*Primary Examiner* — Timothy A Musselman
(74) *Attorney, Agent, or Firm* — Yee & Associates, P.C.

(57) ABSTRACT

An electronic device for collecting evidence during training sessions. The electronic device comprises a communications module for acquiring real-time training session data during a training session; a real-time data acquisition module for generating time-stamped training session data; an input unit for acquiring instructor rating data input by an instructor during the training session; a real-time instructor rating module for generating time-stamped instructor rating data; a storing module for storing real-time data of the training session in a data repository, including the time-stamped training session data and the time-stamped instructor rating data; a debriefing module for retrieving real-time data of a training session from the data repository, replay the real-time data on a display, and update the instructor rating data in the data repository with updated instructor rating data received from an instructor during the replay.

25 Claims, 15 Drawing Sheets

(51) Int. Cl.
    *G06N 5/02*       (2006.01)
    *G09B 9/08*       (2006.01)
    *G09B 19/16*     (2006.01)

(52) U.S. Cl.
    CPC ............... *G09B 5/06* (2013.01); *G09B 9/08* (2013.01); *G09B 19/165* (2013.01)

(56) References Cited

U.S. PATENT DOCUMENTS

| | | |
|---|---|---|
| 2013/0280678 A1 | 10/2013 | Towers et al. |
| 2014/0212847 A1 | 7/2014 | Holder et al. |
| 2016/0293037 A1 | 10/2016 | Jacques et al. |
| 2016/0358498 A1 | 12/2016 | Fucke et al. |

OTHER PUBLICATIONS

European Search Report, dated Feb. 24, 2017, regarding Application No. EP16382593.8, 4 pages.
European Office Action, dated Mar. 15, 2017, regarding Application No. EP16382593.8, 8 pages.

ELECTRONIC DEVICE AND METHOD FOR DEBRIEFING EVIDENCE-BASED TRAINING SESSIONS

CROSS-REFERENCE TO RELATED APPLICATION

This application claims the benefit of priority of European Patent Application No. EP16382593.8, filed Dec. 9, 2016, entitled "Electronic Device and Method for Debriefing Evidence-Based Training Sessions", which is incorporated herein by reference in its entirety.

BACKGROUND INFORMATION

1. Field

The present disclosure is comprised in the field of system and methods for evaluating the performance of trainees during a training session, and more particularly for evidence-based training.

2. Background

Evidence-based training (EBT) relates to a new assessment and training concept that enables competency-based training, using operational data to develop competency to manage risks in operations. A competency is a combination of knowledge, skills and attitudes required to perform a task to the prescribed standard. Demonstration of competencies can be assessed using behavioral indicators, which should meet the required level of performance, as established by the operator for a specific operation.

In the field of aviation, flight crew evaluation is currently conducted by an instructor using paper forms during the training session, which normally includes a flight simulation. Matching the instructor's comments on paper with flight data analysis and behavior of the trainees during the simulation registered on a video recording, requires additional registration of the simulation time by the instructor and then use of an external video or flight data recording system during debriefing. Furthermore, the instructor needs to memorize his/her comments and apply them to the behavioral descriptors, if ratings within the EBT competency framework are required.

The difficulty in integrating video or data recordings into the debriefing often leads to the instructor not using these facilities if they are provided by the simulator. However, the sole reliance on the instructors' knowledge of the behavioral framework for rating the students results in subjective and unreliable ratings which are unacceptable on a EBT behavioral framework used for pass or fail decisions for flight crew qualification.

Moreover, the quality assurance of the instructor performance rating is difficult when the instructor's notes are recorded on paper and only a final assessment is captured in electronic format, making a consistent level of instruction harder to achieve. Although there are some software tools for recording instructor ratings, they merely replace paper-based recording of instructor evaluations without integrating a debriefing functionality providing direct access to competency levels, simulator data or video recording.

The industry is currently embracing the concept of competency-based training, instead of scenario-based training. Therefore, there is a need for a tool enabling competency-based training and a reliable competency evaluation in an evidence-based training environment.

SUMMARY

An embodiment of the present disclosure provides a training system comprising a communications module, a real-time data acquisition module, an input unit, a real-time instructor rating module, a storing module, a debriefing module, and an artificial intelligence system. The communications module is configured to acquire real-time training session data during a training session of a trainee, wherein the real-time training session data includes training device data obtained from a training device, and video data. The real-time data acquisition module is configured to generate time-stamped training session data. The input unit is configured to acquire instructor rating data input by an instructor during the training session. The real-time instructor rating module is configured to generate time-stamped instructor rating data. The storing module is configured to store real-time data of the training session in a data repository, wherein the real-time data includes the time-stamped training session data and the time-stamped instructor rating data. The debriefing module runs on a processor unit and is configured to receive the real-time training session data for the training session; generate the time-stamped training session data; receive the real-time instructor rating data; and generate the time-stamped instructor rating data. The artificial intelligence system is configured to analyze the real-time training session data and the real-time instructor rating data as the time-stamped training session data is received Another embodiment of the present disclosure provides an electronic device for debriefing evidence-based training sessions. The electronic device comprises a communications module, a real-time data acquisition module, an input unit, a real-time instructor rating module, a storing module, and a debriefing module. The communications module acquires real-time training session data during a training session of a trainee, wherein the training session data includes video data. The real-time data acquisition module generates time-stamped training session data. The input unit acquires instructor rating data input by an instructor during the training session. The real-time instructor rating module generates time-stamped instructor rating data. The storing module stores real-time data of the training session in a data repository, wherein the real-time data includes the time-stamped training session data and the time-stamped instructor rating data. The debriefing module retrieves real-time data of a training session from the data repository; integrates time-stamped instructor rating data with video data of the training session; replays the integrated data on a display; and updates the instructor rating data in the data repository with updated instructor rating data received from an instructor during the replay. The real-time instructor rating module is configured to retrieve a checklist box including actions to be performed by the trainee during a pre-defined scenario event; analyze the training device data received from the training device; based on the analysis of the training device data, automatically check execution of at least one action included in the checklist box performed by the trainee during the training session; and provide real-time feedback to the instructor regarding the execution of the at least one action.

Yet another embodiment of the present disclosure provides a computer-implemented method for debriefing evidence-based training sessions. Real-time training session data is acquired during a training session of a trainee, wherein the training session data includes training device data obtained from the training device and video data. Time-stamped training session data is generated. Instructor rating data input is acquired by an instructor during the training session and generate time-stamped instructor rating data. Real-time data of the training session is stored session in a data repository, wherein the real-time data includes the time-stamped training session data and the time-stamped instructor rating data. Real-time data is a training session is retrieved from the data repository. Time-stamped instructor rating data is integrated with video data of the training session. The integrated data is replayed on a display. The instructor rating data in the data repository is updated with updated instructor rating data received from an instructor during the replay. A checklist box including actions to be performed by the trainee during a pre-defined scenario event is retrieved. The training device data received from the training device is analyzed. Automatically checking execution of at least one action included in the checklist box is performed by the trainee during the training session. Real-time feedback is provided to the instructor regarding the execution of said at least one action.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The present disclosure refers to an electronic device for rating and debriefing Evidence Based Training (EBT) sessions, such as a flight training session performed using a flight simulator.

Figure 1:
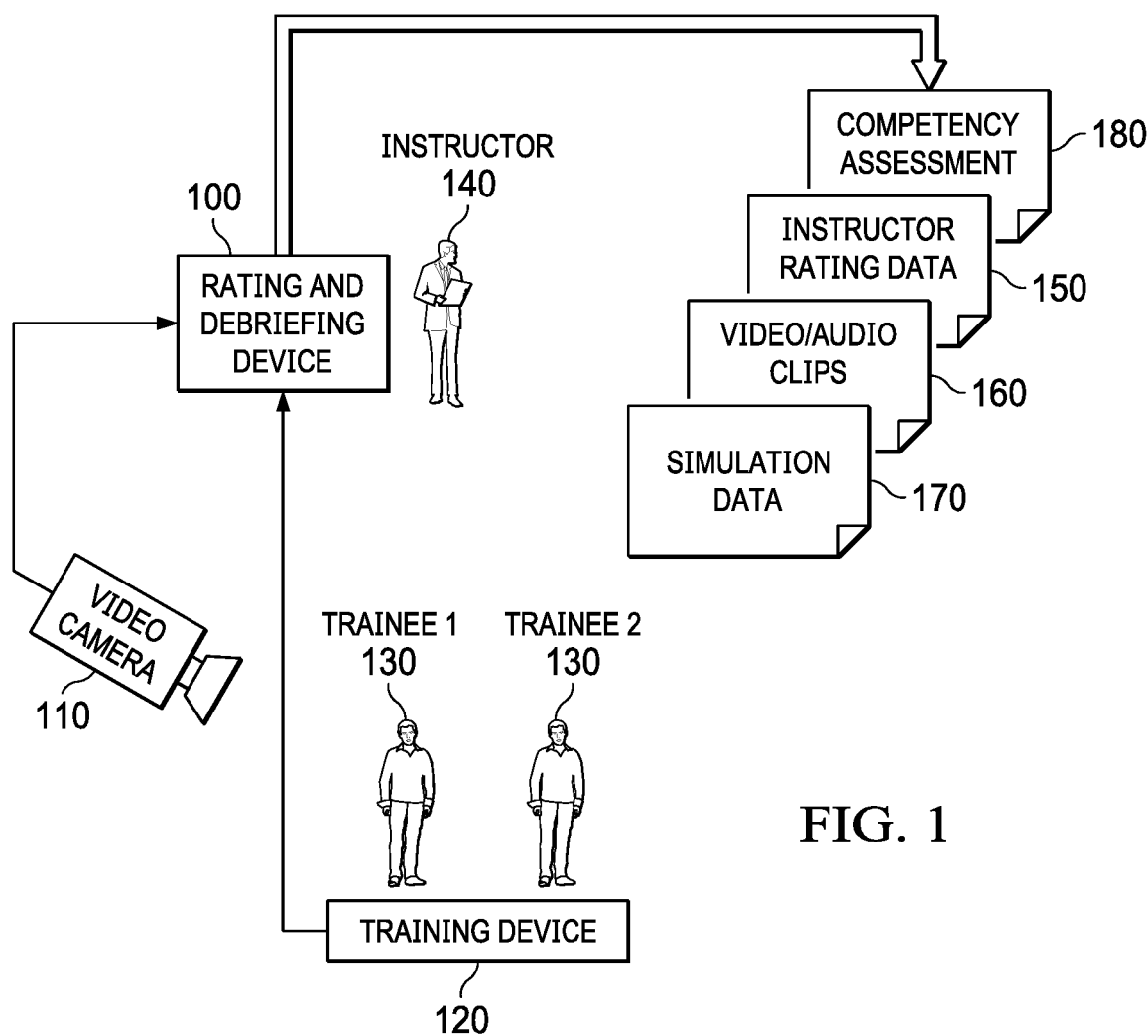
FIG. 1 depicts a schematic diagram of a training tool framework.

FIG. 1 schematically depicts an embodiment of a training tool framework, in which a rating and debriefing electronic device 100 acquires data from a video camera 110 and a training device 120 (such as a flight simulator, a desktop simulation, a videogame or any other interactive training platform) during a training session executed by one or more students or trainees 130 (for instance, the training session may be conducted by a flight crew, such as a pilot and a copilot). The electronic device 100 can be connected to a video-recording system used inside the simulator and to the data output from the simulator or training platform.

An instructor 140 is in charge of rating the trainees 130 during the training session. At the same time, the rating and debriefing electronic device 100 stores a video stream received from the video camera 110 and data coming from the training device. The rating and debriefing electronic device 100 allows the instructor 140 to perform a real-time rating of the training session during execution. The instructor rating data 150 may include event ratings, comments, and/or competency performance. The instructor ratings, the video or audio clips 160 of the training session and the simulation data 170 are later on available to the instructor to debrief the students to obtain a competency assessment 180 of each trainee 130 (e.g. their competency performance).

Figure 2:
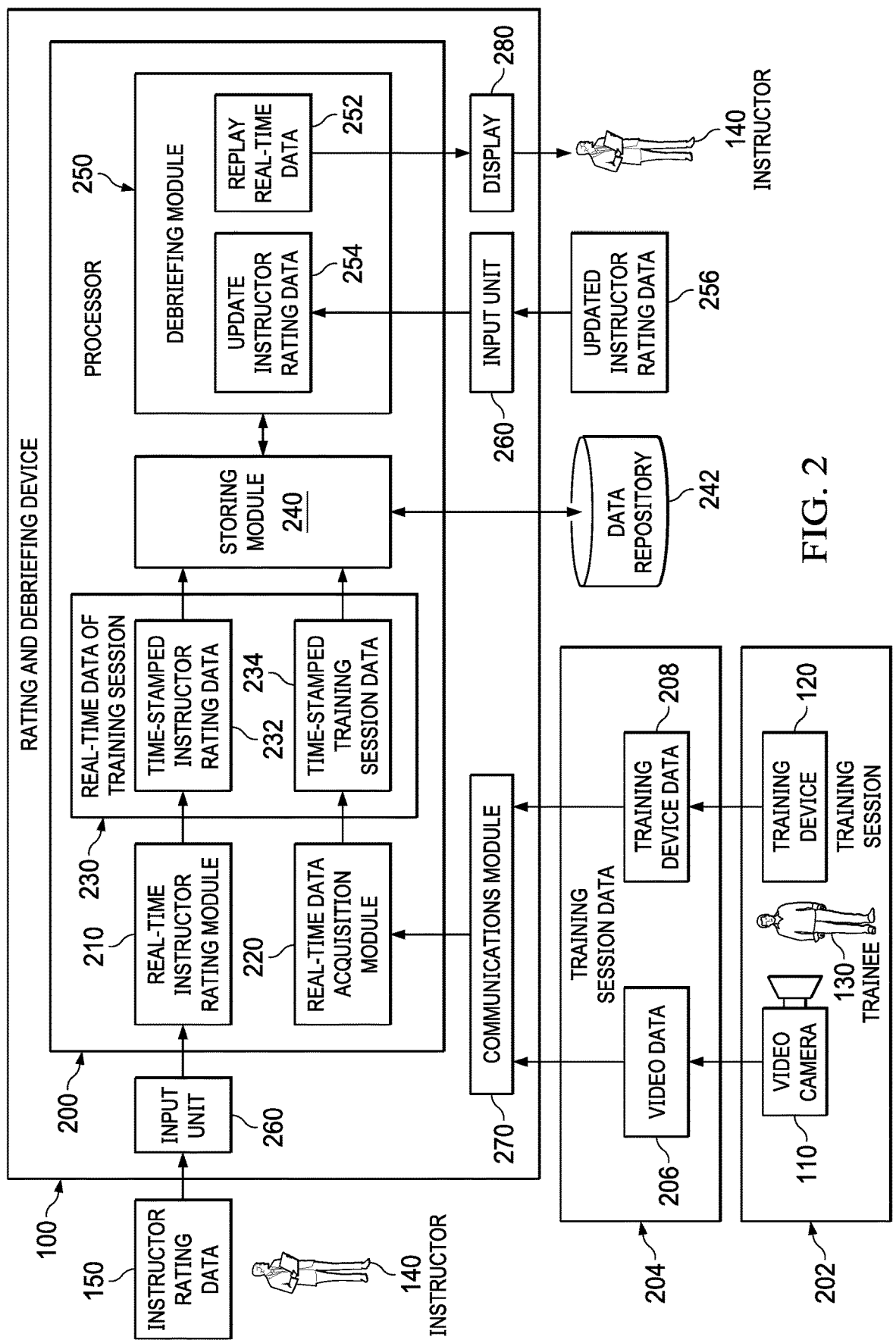
FIG. 2 represents a schematic view with the components of the rating and debriefing device.

A more-detailed schematic view of the training tool framework is represented in FIG. 2. In the illustrative examples, the same reference numeral may be used in more than one figure. This reuse of a reference numeral in different figures represents the same element in the different figures.

To implement the rating and debriefing, the electronic device 100 comprises two main modules: a real-time instructor rating module 210 used during pilot training in a flight simulator (or any other training device 120), and a debriefing module 250 used after the training session 202 for debriefing.

An input unit 260 of the electronic device 100 acquires the instructor rating data 150 including the ratings and comments of the instructor 140 inserted during the training session 202. The input unit 260 may be a keyboard, a tactile screen or any other input means with a graphical user interface. The electronic device 100 may be implemented in a computer station (personal computer, workstation, etc.) or a mobile device, such as a smartphone, PDA or a tablet computer.

The electronic device 100 also comprises a communications module 270 through which the device receives training session data 204 generated during the training session 202. Training session data 204 can also be referred to as real-time training session data. The training session data 204 at least includes video data 206 captured during execution of the training session 202. In an embodiment, the video data 206 is recorded by an external video camera 110 (FIG. 2). In another embodiment, the video data is registered by the training device 120 itself (for instance, the training device may be a software flight simulator that captures video data of the training session 202 at a rate of 24 fps).

The training session data 204 may also include training device data 208 output by the training device 120. In other words, training device data 208 is data obtained from training device 120. In the illustrative example, training device data 208 is data related to the simulation that is running on training device 120. For example, the training device data 208 may be at least one of a user input, simulated object data, or other suitable types of data. Simulation data 170 is an example of training device data 208 and could include airplane attitude, airplane configuration, or other suitable data. Simulation data 170 in FIG. 1 is a type of training device data.

Training device 120 is any physical device that can be used for training. For example, training device 120 can be a desktop computer running a flight simulator program. As another example, the training device 120 can be a flight simulator physically reproducing the flight deck of an aircraft, including flight deck panels with manipulators, buttons, and displays.

The training device data 208 may include a collection of variables retrieved and/or computed by the training device 120. For instance, when the training device 120 is a flight simulator, the training device data 208 may include simulator data comprising input data (e.g. steering, thrust) generated by the trainee 130 and output data computed by the flight simulator (e.g. altitude and aircraft speed). The communications module 270 may receive the training session data 204 wirelessly (e.g. via Bluetooth, WiFi or Zigbee). Alternatively, the communications module 270 may be a wired communication module, such as an USB, an RS-232 or an RS-485 module.

A real-time data acquisition module 220 of the electronic device 100 receives the training session data 204 and incorporates a time stamp, generating time-stamped training session data 234. Similarly, the real-time instructor rating module 210 receives the instructor rating data 150 and generates time-stamped instructor rating data 232. A storing module 240 of the electronic device 100 is configured to perform the storing of the time-stamped real-time data 230 of training session in a data repository 242, including both the time-stamped instructor rating data 232 and time-stamped training session data 234. The data repository 242 may be a part of the electronic device 100 or an external repository. Hence, the real-time data 230 of training session may be stored locally on the electronic device 100, or externally in an external storage device (a server, a cloud service, an external hard disk drive, etc.).

Debriefing module 250 can be implemented in software, hardware, firmware, or a combination thereof. When software is used, the operations performed by debriefing module 250 may be implemented in program code configured to run on hardware, such as a processor unit. When firmware is used, the operations performed by debriefing module 250 may be implemented in program code and data and stored in persistent memory to run on a processor unit. When hardware is employed, the hardware may include circuits that operate to perform the operations in debriefing module 250.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

After the training session 202, the debriefing module 250 access the real-time data 230 of training session stored on the data repository 242. The debriefing module 250 is configured to replay the real-time data 230 on a display 280 (a display of the electronic device 100 or an external display), integrating the time-stamped instructor rating data 232 with the time-stamped training session data 234. To that end, instructor's comments or ratings may be integrated, for instance, with the video data 206 of the training session 202, in a similar way as subtitles are integrated into a video stream to form integrated data. Alternatively, or additionally, instructor's comments or ratings may also be integrated with the output simulator data of the training device 120.

During debriefing, the instructor 140 watches the replay 252 with the instructor ratings or comments previously inserted. The instructor may then update the instructor rating data after a thorough analysis of the replay 252. The debriefing module 250 receives the updated instructor rating data 256 from the input unit 260, and updates 254 the instructor rating data stored on the data repository 242, including the new comments or ratings.

In the embodiment shown in FIG. 2, the real-time data acquisition module 220, the real-time instructor rating module 210, the debriefing module 250 and the storing module 240, in charge of managing the storing of data, are integral part of a processor 200 or a central processing unit.

Figure 3:
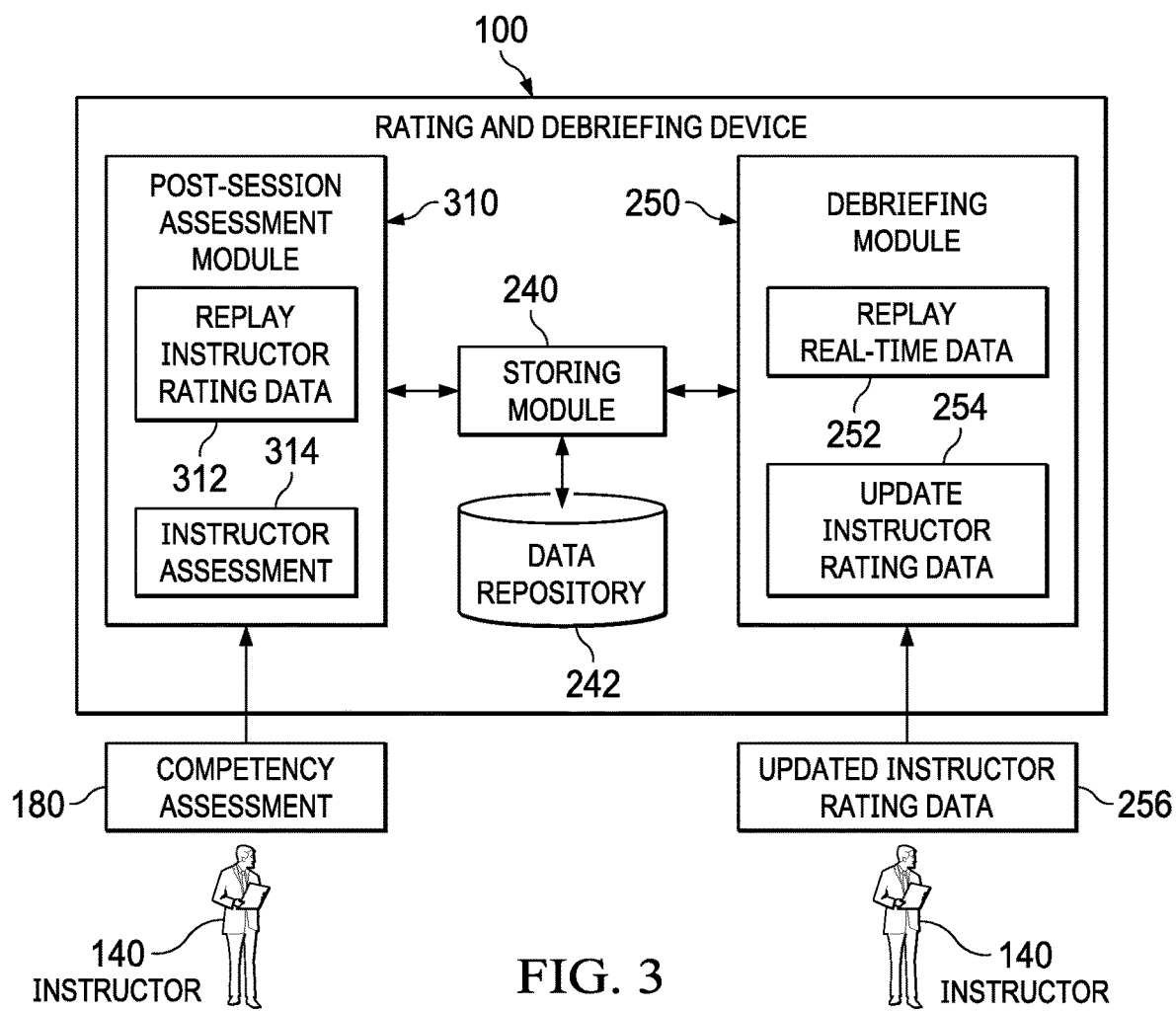
FIG. 3 depicts the rating and debriefing device with a post-session assessment module.

Additionally, the electronic device 100 may comprise a post-session assessment module 310, represented in the embodiment of FIG. 3, which only depicts part of the electronic device 100. This module is used to access and review all the data collected during the training session 202 and perform an instructor assessment 314 based on the data and comments collected after the training session 202. The post-session assessment module 310 replays 312 instructor rating data of a training session 202 previously stored on the data repository 242. The instructor 140 reviews this information and prepares a competency assessment 180 of the trainee. The post-session assessment module 310 then generates an instructor assessment 314 for the training session 202 based on the competency assessment 180 made by the instructor 140. The instructor assessment 314 for the training session 202 is then stored on the data repository 242.

Figure 4:
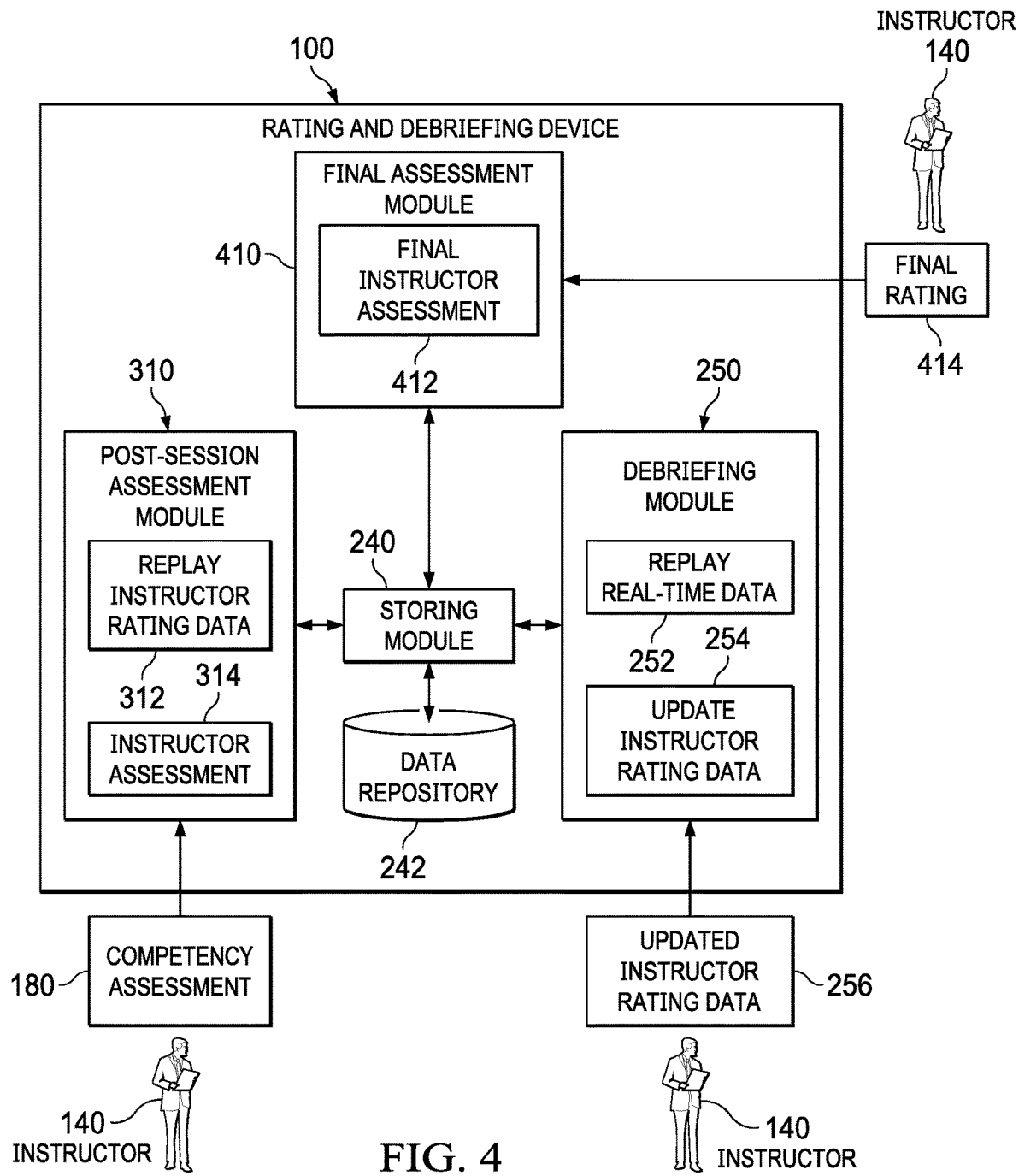
FIG. 4 shows the rating and debriefing device including a final assessment module.

As depicted in the simplified embodiment of FIG. 4, the electronic device 100 may comprise an additional module, a final assessment module 410 used to include a final instructor assessment after the simulator session. This module receives from the instructor 140 a final rating 414 (e.g. pass or fail) and generates a final instructor assessment 412 for the training session 202.

The illustration of debriefing module 250 FIGS. 2-4 has been described with respect to debriefing operations performed after a training session. This illustration is not meant to limit the manner in which debriefing module 250 can operate in other illustrative examples. For example, debriefing module 250 can operate to perform a debriefing operation during a training session and during a scenario event. In other words, the debriefing may occur after an action has been performed while a scenario event is still occurring during a training session. In this manner, debriefing module 250 can also provide feedback in real-time after the performance of one or more actions. For example, the debriefing module 250 can notify the instructor during the training session that the students did not perform a certain action required by a checklist (e.g., turn-on seat belt sign). This notification would allow the instructor to repeat the checklist during the training session without having to wait for another training session. These actions may be for the same scenario event or a different scenario event.

Figure 5:
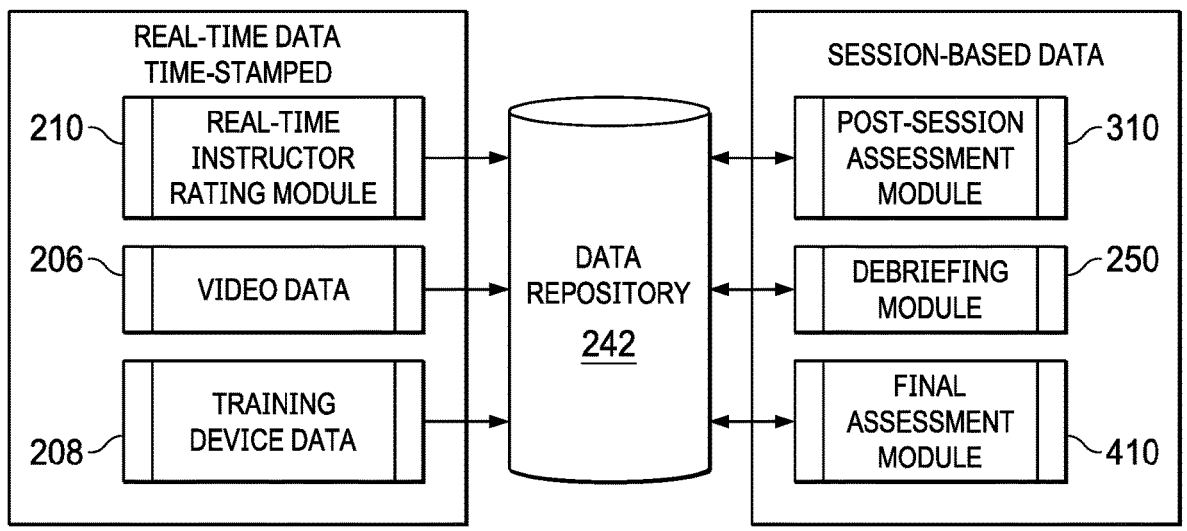
FIG. 5 depicts the integration of the different components of the rating and debriefing device.

FIG. 5 depicts another schematic diagram visualizing the integration of the different system components. On the left column, real-time data generated during the training session 202 (e.g. video data 206 from the video camera, simulator data 208 from the training device 120, and instructor rating data 232 from the instructor rating module 210) is time-stamped and stored on the data repository 242. Once the training session 202 is finished, session-based data is reviewed, updated and stored on the data repository 242 (right column). After the training session 202, the debriefing module 250 updates 254 the instructor rating data in the data repository 242 based on the new comments or ratings received from the instructor 140 during replay of the data stored for said training session.

Optionally, a post-assessment module 310 and a final assessment module 410 allow, respectively, to include an instructor assessment 314 and a final instructor assessment 412 for the training session 202. Due to the large data volumes of video recordings, it is important to make provisions for the video data being available for debriefing immediately after the training session 202. For that purpose, the video data should be downloaded and stored on the data repository 242 continuously, with the other data. If no central repository is used, all data is stored locally with a common time stamp and is available without delay for the post-session activities.

Figure 6:
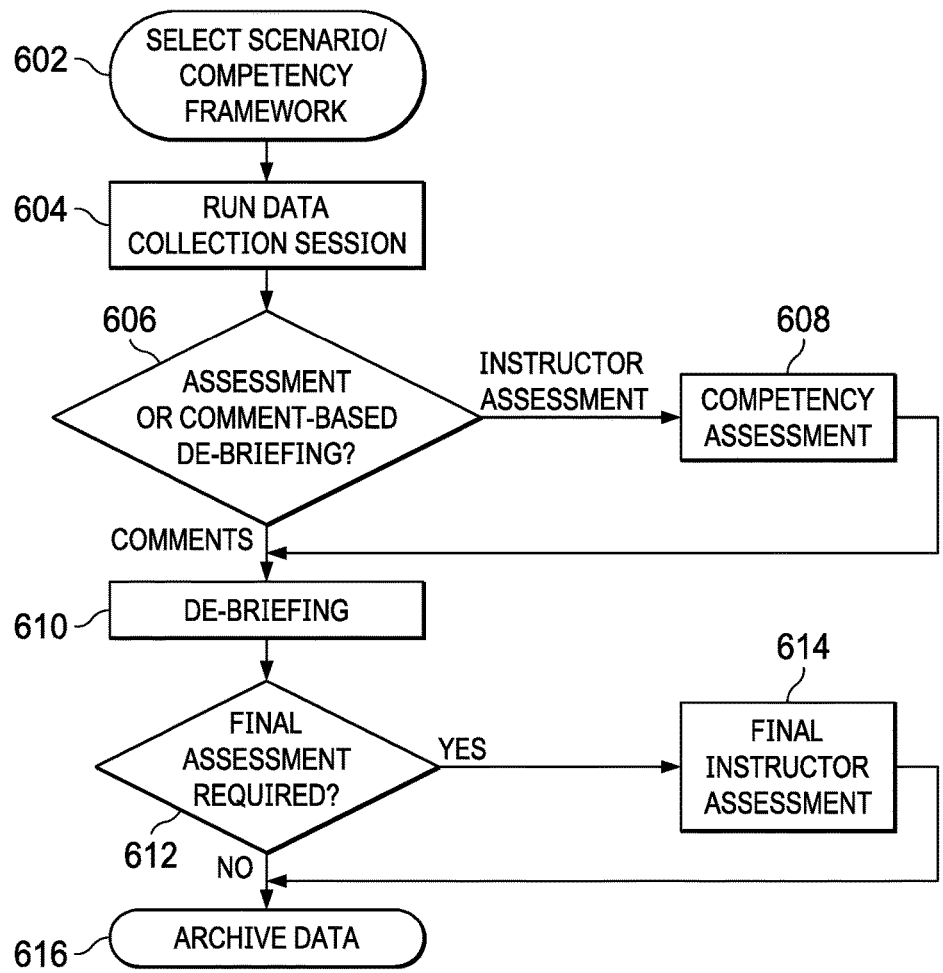
FIG. 6 shows a flow diagram with steps involved in the debriefing and assessment.

FIG. 6 represents a simplified flow diagram of a method for rating and debriefing evidence-based training sessions considering the post-assessment module 310 and the final assessment module 410.

The instructor 140 first selects 602, using a graphical user interface of the electronic device 100, the scenario or competency framework which sets the trainee's competencies to analyze. Data collection 604 of the training session 202 is then started. The instructor 140 then selects 606 whether the debriefing is based on comments or an instructor assessment. In the latter case, a competency assessment 608 is obtained from the instructor for debriefing 610. If the competency assessment is not necessary, the debriefing 610 is performed only based on instructor's comments inserted during the training session. As a result, instructor 140 does not need to assess competencies and can skip those evaluations. The instructor 140 may also determine 612 whether a final assessment is required or not. If it is required, a final instructor assessment 614 (e.g. pass/fail) is obtained from the instructor 140. Finally, the updated evaluation data for the training session is stored 616.

Therefore, to support different types of training and performance rating, debriefings may be based on the instructor comments collected in real-time (typical for flight crew training and evaluation) or on a post-session instructor assessment. While in both cases real-time comments and data are collected, an assessment-based debriefing requires an additional step in which the instructor reviews his/her comments and makes an assessment of the competency performance 608 of the trainees which is then used to support the debriefing 610. If the user desires a comment-based debriefing, the intermediate step of collecting instructor assessments 608 is not required. If a final assessment 614 (e.g. pass/fail) is desired, the instructor input is required before storing 616 all the data on the repository. The debriefing and final assessment options are specified by the instructor in a setup screen.

Hence, directly after the training session 202 the instructor 140 can access the post-session assessment module 310 for a competency assessment 608 and the final assessment module 410 for a final instructor assessment 614. These modules may display a timeline with all the comments/ratings submitted, a list of comments in the selected time window, a complete list of competencies and behavioral descriptors with a rating feature using the same ratings scale as the one used during the training session 202, and a final rating input. The data input by the instructor in these modules (behavioral descriptor ratings and final rating) are stored without a time stamp since they are representative of the entire session.

While the post-session assessment module 310 and the final assessment module 410 allow access to all information collected and is limited for use by the instructor 140, the debriefing module 250 allows access only to the information that is deemed useful for student debriefing.

Figure 7:
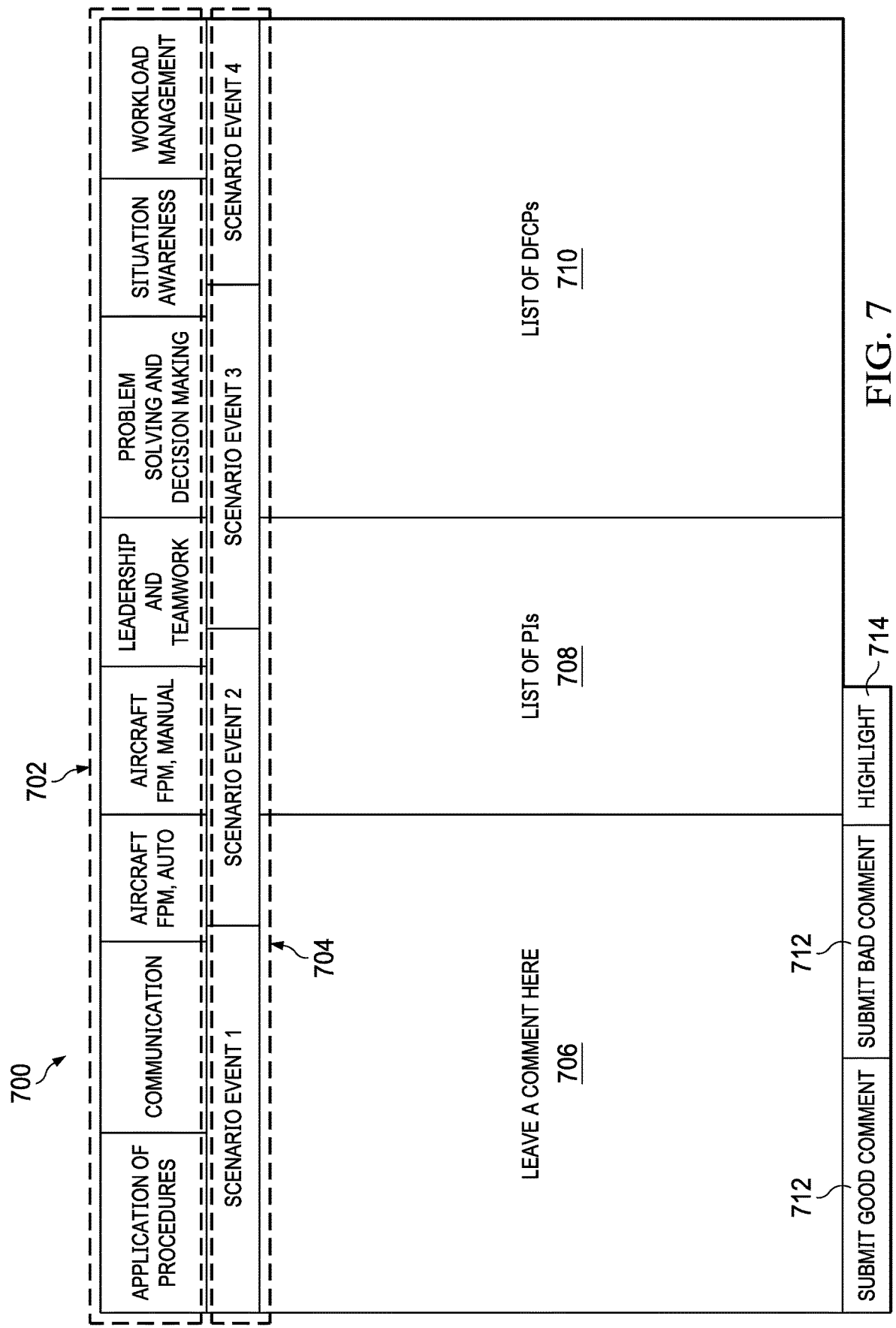
FIGS. 7 and 8 depict a graphical user interface used for performing the instructor rating.

The real-time instructor rating module 210 of the electronic device 100 employs a graphical user interface to acquire the instructor rating data 150. FIG. 7 illustrates an example of a possible embodiment of the graphical user interface 700 of this module applied to flight crew evaluation. The top row shows the competencies 702 considered in the Evidence-Based Training (EBT) session; in particular, the eight core competencies described in the International Civil Aviation Organization (ICAO) manual of EBT. However, other competency frameworks may be used. The second row contains the scenario events 704 describing the training scenario (the use of scenario events 704 is optional). These events may be downloaded from a database or predefined by the instructor using an ad-hoc software tool.

A scenario event is an event that is planned to occur during the training session. The scenario can be an event happening in a scenario script that is planned by the assessor when creating the scenario script. For example, a scenario event can be an engine outage, a maneuver, weather approaching the airport before takeoff, a go-around, or some other suitable event. A scenario event involves a group of actions that are performed for the event. This group of actions may be specified as required actions by a standard, a rule, a policy, or some other suitable authority. For example, in a go-around, a possible group of actions are making a callout and setting the airplane in go-around (GA) thrust, making a callout for flaps and retracting the flaps, making a callout for positive climb and then performing actions for a gear up and retracting the gear using the correct control.

The third row contains a text entry box 706 for the instructor 140 to leave comments during the training session 202, a non-editable text box 708 that lists EBT performance indicators (PIs), also known as behavioral indicators, and a checklist box 710 that lists different items of a desired flight crew performance (DFCP), which are observable actions and behaviors expected to be performed by the flight crew during pre-defined scenario events. The desired flight crew performance can include, for example, recognizing a requirement for anti-icing procedures, making a required announcement, configuring aircraft systems for a de-icing or anti-icing treatment, using standard terminology, or other suitable actions or behaviors.

Since the electronic device 100 has direct access to the training device data (208), some of these actions could be automatically checked. For example, the correct execution of actions during maneuvers such as a go-around, could be directly marked as completed by retrieving changes in the flap settings, throttle position, landing gear position. The electronic device would then ensure that the actions were performed in the correct order and give real-time feedback to the instructor regarding the failure/success of these actions. The instructor could then compare the feedback given by the tool with his own markings, in case he missed some action performed by the flight crew. Actions that cannot be accessed from the simulator data (e.g., proper communication) would have to be manually marked by the instructor 140.

Below the third row the graphical user interface 700 shows two submit comment buttons 712 to submit good or bad comments or notes created by the instructor 140. Alternatively, the rating can be on a rating scale using a range of numbers or a range of letters or phrases that describe the rating. The ratings are saved in association with the comments. The instructor 140 can also highlight certain observation using a highlight button 714; this function could be used to force highlighting of certain observations for debriefing purposes or no-pass observations if the simulator session is being performed as a proficiency check.

Figure 8:
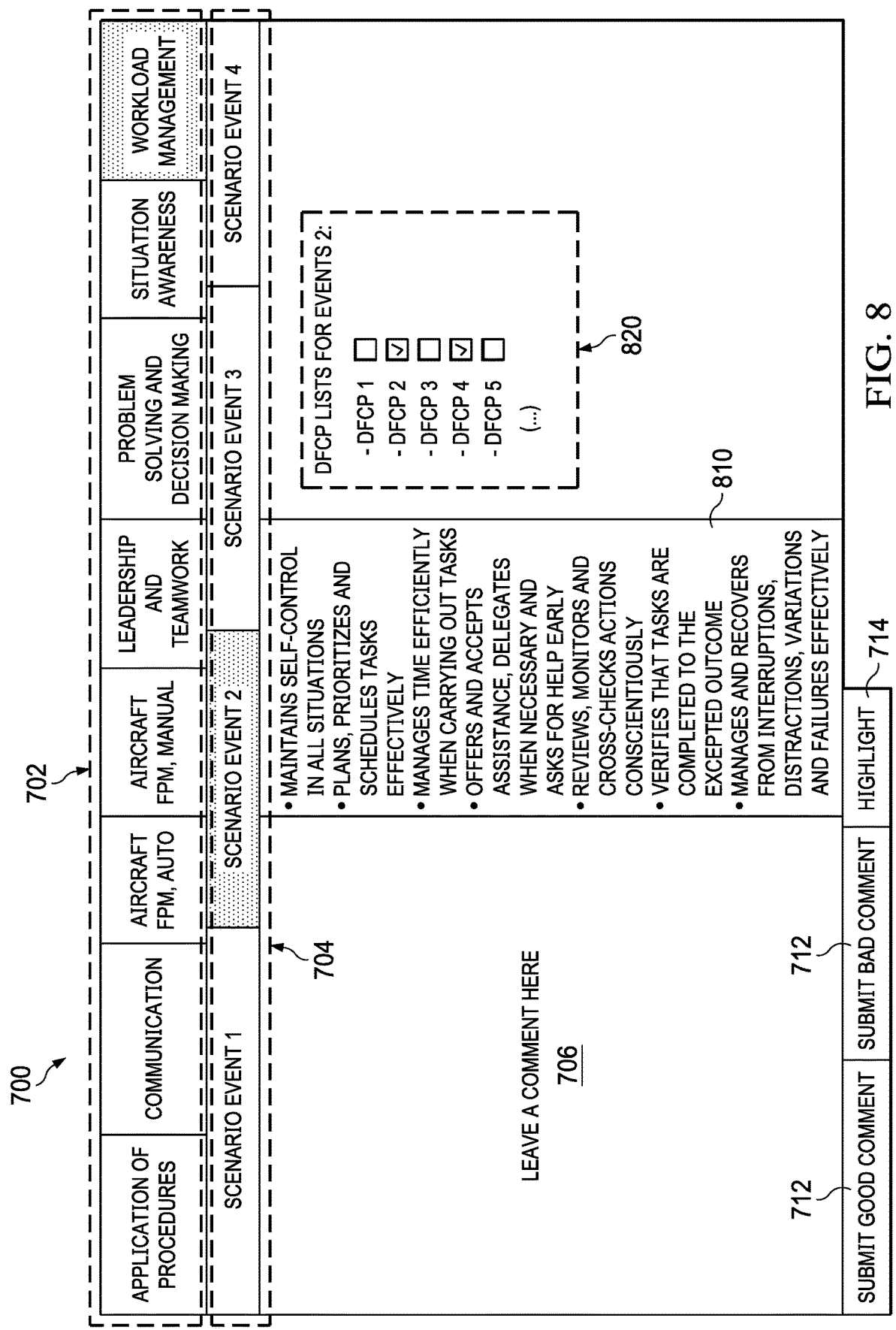

When selecting a competency 702, a list of performance indicators 810 is automatically filled-in with the respective performance indicators (see example of FIG. 8, where the instructor is preparing to write a comment on the competency "Workload Management" during a certain scenario event 704). In this way, the instructor could write a comment that is related to that competency 702 and have a refresher of the performance indicators 810 that describe that competency 702. For example, the instructor 140 may have noticed that the flight crew being evaluated has difficulties in planning their tasks at that moment. Then, the instructor 140 would write a comment about that and mark it has a "Workload Management" issue. Inputting the comment could be done, for instance, through a standard keyboard, on-screen keyboard as well as on-screen handwriting or voice recognition. The list of performance indicators 810 is displayed to assure that the comment is correctly categorized.

The instructor 140 could also mark any performance indicator 810 displayed if needed to define the comment in terms of the more detailed performance indicators. Then, the instructor 140 can submit the comment using the "Submit Good Comment" or "Submit Bad Comment" button. Finer rating scales are possible, e.g. a 5-point scale. This comment is then saved and associated with the associated competency 702 and/or performance indicators 810, and with a time stamp that is related to the video being recorded, so that the instructor can later retrieve this comment associated with the right moment of the video recording. In addition, the instructor rating module 210 may also provide means to identify whether the recorded comment or the scenario event relates to the performance of an individual crew member or to the entire crew (e.g., captain, first officer, both).

The instructor rating module 210 may also have a scenario event 704 selected during the training session 202. The events progression could be done automatically, analyzing the simulator data (i.e. the output of the training device 120), or manually. FIG. 8 shows the graphical user interface 700 wherein a certain flight event (in this case the second scenario event) is selected. By having access to the DFCP list 820, the instructor 140 would know what to look for in the flight crew. The instructor could also mark any action by the flight crew that would match a DFCP item. This mark is also time-stamped so that the instructor 140 can retrieve it later on when watching the recorded video.

The instructor rating module 210 then allows the instructor 140 to write comments while checking which actions or behaviors are expected from the flight crew. The instructor 140 can relate the comments to behaviors that the flight crew are not showing or to behaviors that exceed the expectations.

Figure 9:
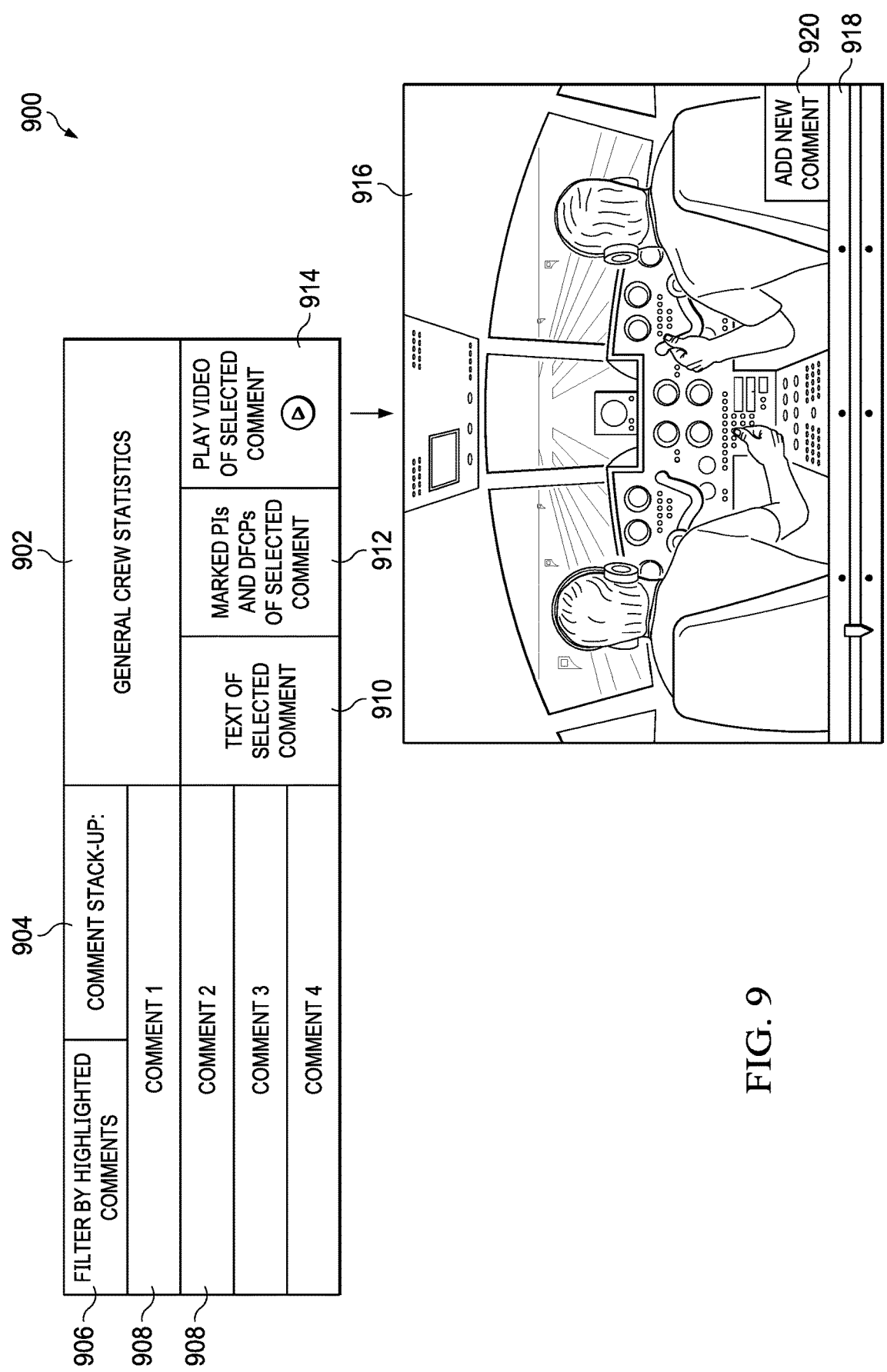
FIG. 9 depicts a graphical user interface used for the instructor debriefing.

After the rating, or directly after the real-time data collection session, the instructor 140 would use the debriefing module 250 for flight crew debriefing. FIG. 9 depicts an embodiment of a debriefing screen 900 depicted by the debriefing module 250. The instructor 250 has access to general statistics 902 from the simulation, like the number of good and bad comments for the each of the competencies and the marked DFCPs. The interface allows the instructor 140 to select a stack-up list 904 including all the comments input during the training session 202 or a list filtered by highlighted comments 906. Each comment 908 may also be coded as a good or a bad comment. When selecting a specific comment 908, the instructor 140 has access to the full text 910 of the selected comment input during the training session, and the competencies and marked PIs and DFCPs 912 that the instructor found pertinent to associate to the selected comment.

Graphical user interface 700 may be used to review segments of video associated with comments made by trainer during a training session. In this illustrative example, comments 908 are made by a trainer during a training session regarding a trainee. These comments may be selected by the trainer to see corresponding video of actions performed when comment 908 was made. In this illustrative example, a selection of a comment 908 results in text 910 being displayed. Additionally, marked PIs and DFCPs 912 can be displayed. The marked PIs and DFCPs 912, includes for example, whether particular required actions were performed.

The instructor 140 can also select to play 914 a video associated to the selected comment. The video 916 shows the captured video data 110 with the trainee's actions during the training session 202 around the time the comment was taken. On the timeline 918 below the video, the instructor 140 also has access to the comments taken during the session (black squares on the timeline). The comments would show in a top-right box, so the instructor 140 could read what he/she noted while watching the video 916 like subtitles in a movie. The instructor could also add new comments 920 while watching the video as well as marking additional DFCPs that were missed during the training session 202, which would cause the update of the general statistics 902 in the debriefing screen 900. In addition to the video replay function, the debriefing screen 900 may also feature a timeline of all comments made, with the rating coded in the display (color, separate line, etc.) and a chart of the ratings made in each category.

Figure 10:
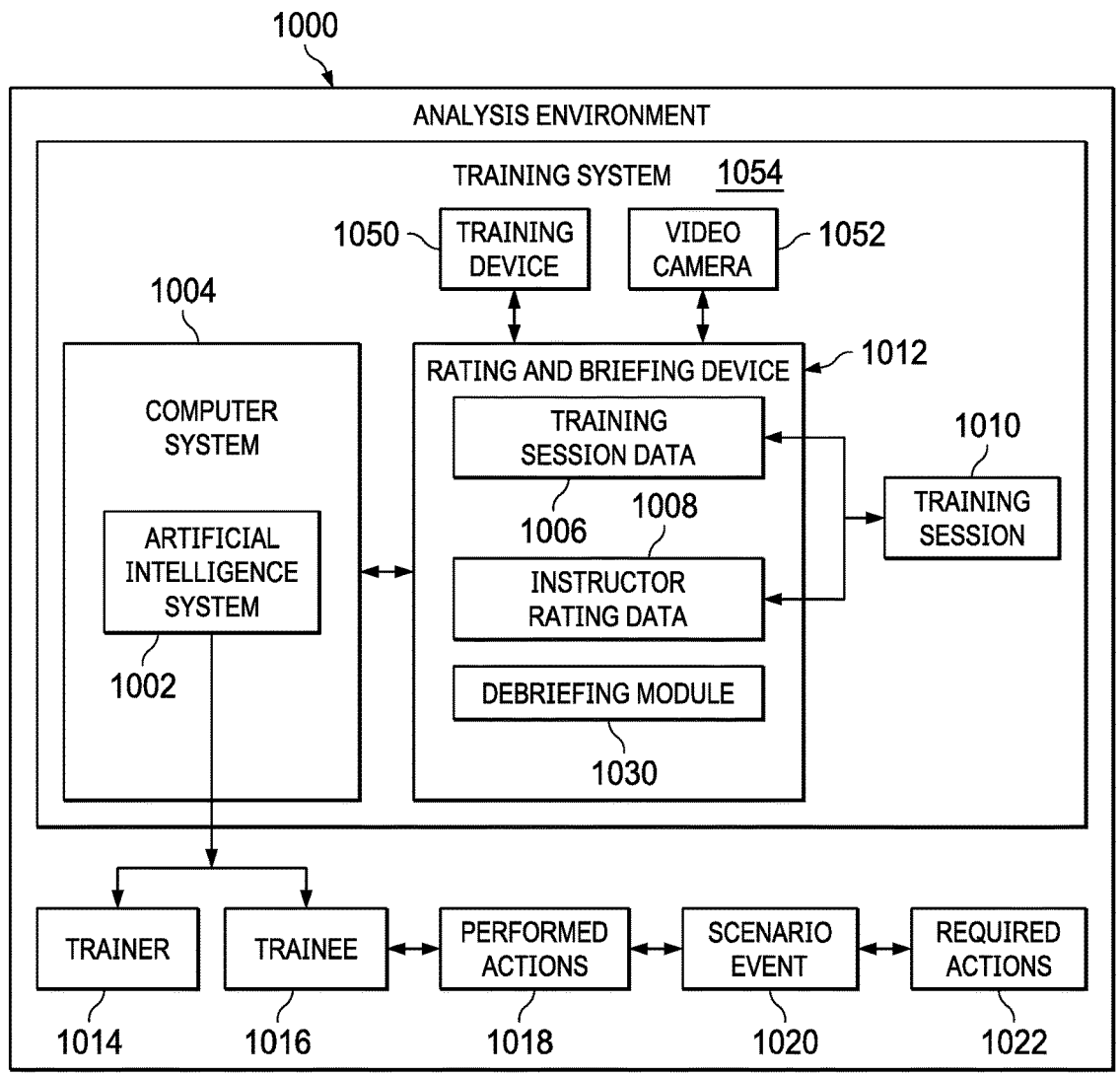
FIG. 10 is an illustration of a block diagram of an analysis environment with an artificial intelligence system for analyzing training session data and instructor rating data in accordance with an illustrative embodiment.

With reference next to FIG. 10, an illustration of a block diagram of an analysis environment with an artificial intelligence system for analyzing training session data and instructor rating data is depicted in accordance with an illustrative embodiment. As depicted, analysis environment 1000 includes artificial intelligence system 1002 running on computer system 1004.

As depicted, artificial intelligence system 1002 can analyze at least one of training session data 1006 or instructor rating data 1008. This analysis can be performed in real-time during training session 1010. This analysis can be made for performed actions 1018 by trainee 1016 for scenario event 1020 during training session 1010. The analysis includes comparing performed actions 1018 to required actions 1022 for scenario event 1020.

In this illustrative example, training session data 1006 and instructor rating data 1008 are located in rating and briefing device 1012. Rating and briefing device 1012 is a data processing system and can be selected from at least one of a laptop computer, a desktop computer, a workstation, a server computer, a mobile phone, a tablet computer, or some other suitable type of data processing system. Training session data 1006 can be received by rating and briefing device 1012 from at least one of training device 1050 or video camera 1052. As depicted, training session data 1006 comprises at least one of training device data, simulation data, video, or other suitable types of data that can be used to analyze the performance of actions by trainee 1016.

Instructor rating data 1008 can be input by trainer 1014 into rating and briefing device 1012. Instructor rating data 1008 comprises at least one of comments, scoring data, or other suitable information used to rate or score the trainee 1016.

As depicted, the computer system 1004 with the artificial intelligence system 1002, the rating and briefing device 1012, the training device 1050, and the video camera form a training system 1054. This data can be analyzed in real-time to provide feedback during the training session 1010. This feedback can be provided to at least one of the trainer 1014 or the trainee 1016.

In this manner, more efficient training can be performed utilizing the artificial intelligence system 1002. With feedback provided during the training session 1010, a maneuver, a procedure, or other scenario event can be performed again in the same training session depending on the feedback received. For example, scheduling another training session after seeing the results of the analysis and post briefing session can be avoided. With as are result additional training during the same training session can be performed to reinforce or correct actions performed by the trainee 1016, resulting in more efficient training.

The analysis environment 1000 is provided for purposes of depicting one manner in which artificial intelligence systems can be used in analyzing training session data and instructor rating data and not meant to limit the manner in which other illustrative examples can be implemented. For example, when performing analysis in real-time during the training session 1010, the artificial intelligence system 1002 can be located in the rating and briefing device 1012 instead of in the computer system 1004. For example, artificial intelligence system 1002 can be located in debriefing module 1030 or as a separate component within rating and briefing device 1012 that can communicate with debriefing module 1030.

As depicted, the rating and briefing device 1012 can be implemented utilizing the rating and briefing device 100 as depicted in FIGS. 1-2. In another illustrative example, the artificial intelligence system 1002 can receive training session data 1006 and instructor rating data 1008 directly.

Figure 11:
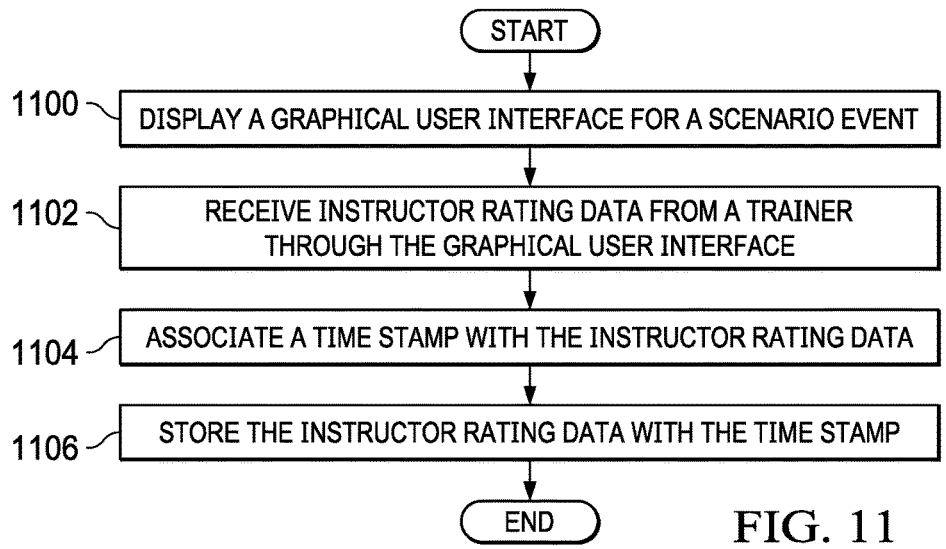
FIG. 11 is an illustration of a data flow diagram of a process for associating instructor comments with a video during a training session in accordance with an illustrative embodiment.

With reference to FIG. 11, an illustration of a data flow diagram of a process for associating instructor comments with a video during training session is depicted in accordance with an illustrative embodiment. In this illustrative example, the different operations in the data flow diagram can be implemented in a debriefing module 250 in FIG. 2 utilizing at least one of software or hardware.

The process begins by displaying a graphical user interface for a scenario event (operation 1100). Graphical user interface 700 in FIG. 7 is an example of a graphical user interface that may be used in operation 1100.

The process receives instructor rating data from a trainer through the graphical user interface (operation 1102). In this example, the instructor rating data takes the form of a comment. The instructor rating data also can include scoring data or other types of information used to grade or rate actions by the trainee. The process associates a time stamp with the instructor rating data (operation 1104).

The process stores the instructor rating data with the time stamp (operation 1106). The process terminates thereafter. The comment and time stamp are stored in a data repository 242 by storing a module 240 in the debriefing device 100 as shown in FIG. 4. This process may be repeated any number of times when instructor rating data, such as a comment, is entered by the trainer. The instructor rating data can be stored in association with the video for the training session. If stored together, the comments made by the trainer are not directly encoded into the video. Instead, the instructor rating data are added on a layer on top of the video.

This process in FIG. 11 runs at the same time video is recorded utilizing a video camera 110 in FIG. 1 during a training session for the scenario event. The video recording includes time stamps indicating a date and time for the different frames. The video also can be stored in a data repository 242. The use of time stamps enables correlating when comments are made by the trainer to the video of the training session for the same event.

Figure 12:
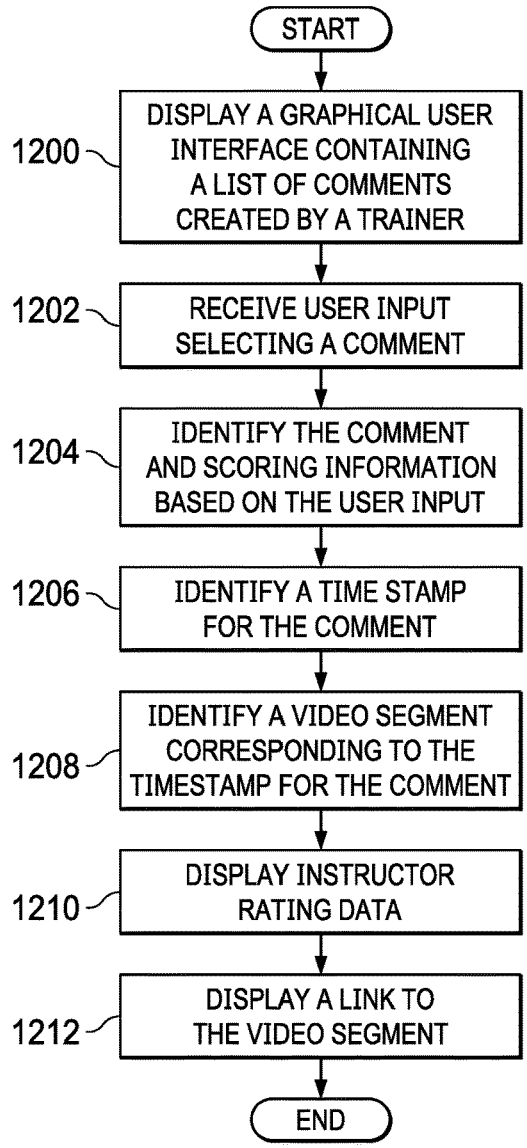
FIG. 12 is an illustration of a flow diagram of a process of a debriefing session utilizing comments associated with a video training session in accordance with an illustrative embodiment.

Turning to FIG. 12, an illustration of a flow diagram of a process of a debriefing session utilizing comments associated with a video training session is depicted in accordance with an illustrative embodiment. In this illustrative example, the different operations in the data flow diagram can be implemented in a debriefing module 250 in FIG. 2 utilizing at least one of software or hardware. This process can be used to review comments and view the video showing actions taken, as well as audio of the training session for the event.

The process begins by displaying a graphical user interface containing a list of comments created by a trainer (operation 1200). As depicted, operation 1200 can be performed using debriefing screen 900 in FIG. 9.

The process receives user input selecting a comment (operation 1202). The process identifies the comment and scoring information based on the user input (operation 1204). The process identifies a time stamp for the comment (operation 1206).

The process identifies a video segment corresponding to the time stamp for the comment (operation 1208). The video segment includes frames having time stamps within a selected amount of time of the time stamp for the comment. The video segment can include video prior to the comment being entered, after the comment being entered, or a combination thereof. The amount of video selected can be based on actions relating to the comment. In other words, the amount of video can be selected based on video including the actions described in the comment. For example, the video segment may include 30 seconds of video prior to the time stamp for the comment and 30 seconds of video after the time stamp for the comment. These actions can be identified in the video using object recognition processes and artificial intelligence systems.

The process displays instructor rating data (operation 1210). In this example, the instructor rating data comprises the comment and also may include scoring or other instructor rating data. The process also displays a link to the video segment (operation 1212). The process terminates thereafter. With this process, a trainer can view a video segment related to the comment created by the trainer during a training session.

Figure 13:
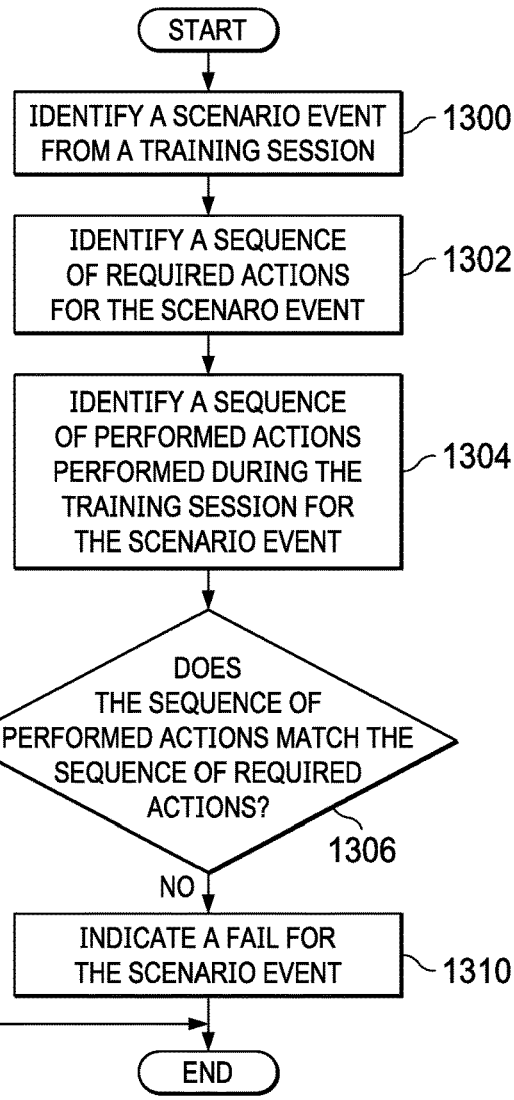
FIG. 13 is an illustration of a flow diagram of a process for automatically analyzing data from a training session in accordance with an illustrative embodiment.

With reference to FIG. 13, an illustration of a flow diagram of a process for automatically analyzing data from a training session is depicted in accordance with an illustrative embodiment. In this illustrative example, the different operations in the dataflow diagram can be implemented in a debriefing module 250 in FIG. 2 utilizing at least one of software or hardware.

The process begins by identifying a scenario event from a training session (operation 1300). The process identifies a sequence of required actions for the scenario event (operation 1302). The process identifies a sequence of performed actions performed during the training session for the scenario event (operation 1304). The sequence of actions performed may be identified any number of different ways. For example, comments, checklists for desired flight crew performance, video, audio, and other training data may be used. These actions may be automatically identified using an analysis process. This process may be implemented in an artificial intelligence system or some other suitable manner. The training data may include information about positions of controls such as levers, switches, when particular controls were activated during the event, and other suitable data that may be obtained from a training device.

A determination is made as to whether the sequence of performed actions match the sequence of required actions (operation 1306). If a match is present, a pass is indicated for the scenario event (operation 1308) with the process terminating thereafter. On the other hand, if a match is absent in operation 1306, a fail is indicated for the scenario event (operation 1310). The process terminates thereafter.

This process can be performed for any number of types of events. In the illustrative example, the event may take a number of different forms for which competency training is performed. The scenario event may be, for example, a go-around, a landing, a takeoff, a preflight checklist, an engine outage, a thunderstorm, or some other suitable type of event.

For example, with a go-around, actions such as callout a go-around, advance thrusters to take off/go-around, callout flaps, move flaps to practice setting, callout a positive rate, callout gear up, and move gear level are actions that are performed for this event in the sequence listed. Actions such as positions of thrust levers, flaps, and the gear lever can be identified from training data. Callouts can be identified by audio which may be recorded individually or as part of a video of the training session. The audio may be processed using voice recognition and natural language processing to identify what was said as well as the speaker. This analysis can be performed using an artificial intelligence system trained to analyze performed actions for a scenario event from a training session.

Figure 14:
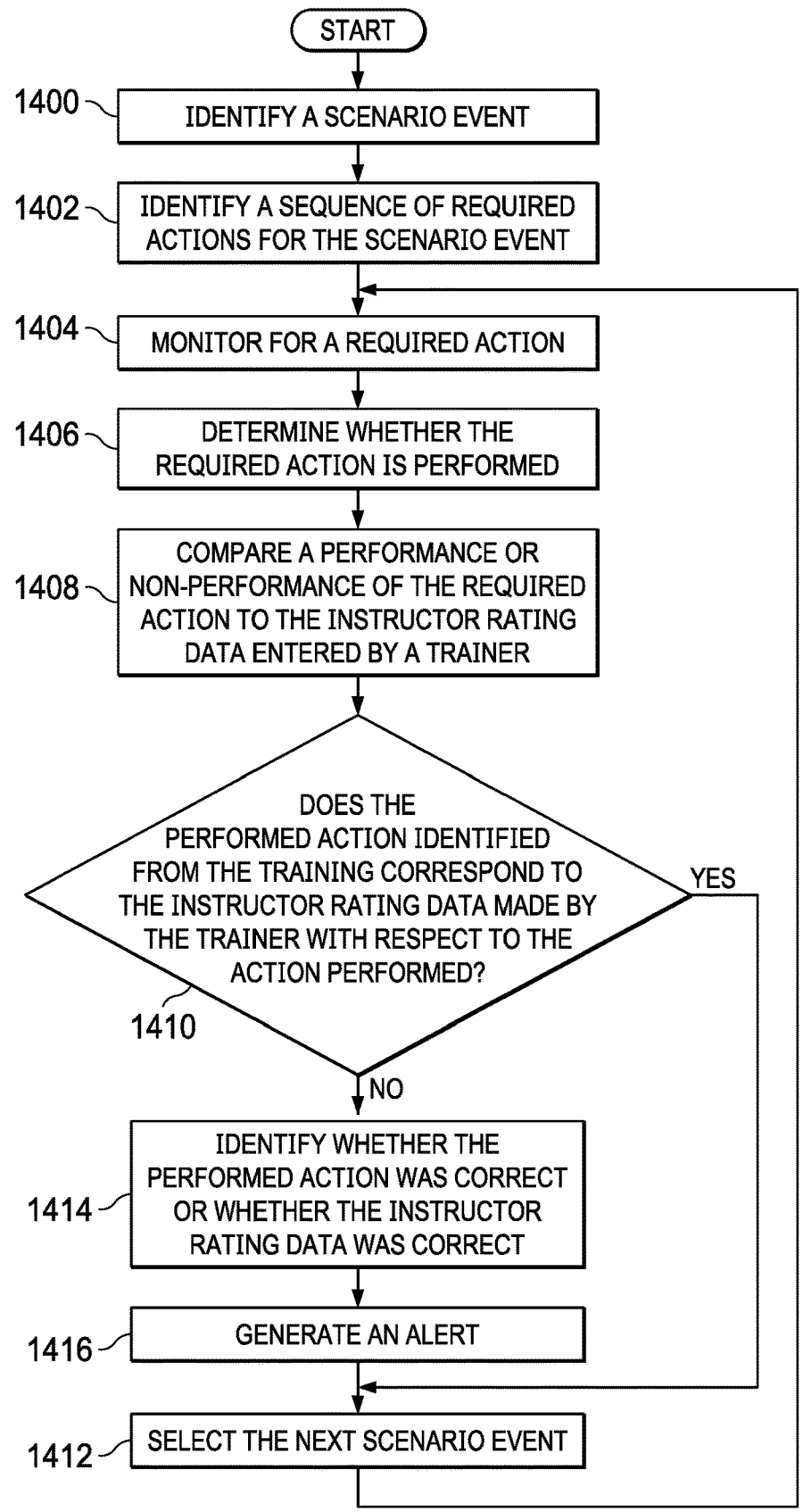
FIG. 14 is an illustration of a flow diagram of a process for analyzing evaluations made by a trainer during a training session in accordance with an illustrative embodiment.

In FIG. 14, an illustration of a flow diagram of a process for analyzing evaluations made by a trainer during a training session is depicted in accordance with an illustrative embodiment. In this illustrative example, the different operations in the dataflow diagram can be implemented in a debriefing module 250 utilizing at least one of software or hardware. This process can be used to compare evaluations of actions performed by a trainee in the training session as compared to the actions performed by the trainee in a video that are analyzed by a computer implemented process such as a process in an artificial intelligence system.

The process begins by identifying a scenario event (operation 1400). The process identifies a sequence of required actions for the scenario event (1402). When the event begins, the process monitors for a required action (operation 1404). The process determines whether the required action is performed (operation 1406). In this illustrative example, the determination in operation 1406 can be made using an artificial intelligence process such that this process runs in real-time during the occurrence of the scenario event in the training session. The determination in operation 1406 can be formed by an artificial intelligence process using training session data. In this illustrative example, the training session data includes at least one of training device data obtained from a training device, video data, audio data, or other suitable data for the training session.

The process compares a performance or non-performance of the required action to the instructor rating data entered by a trainer (operation 1408). The comparison may be made to see whether the required action was performed by the trainee as shown in the instructor rating data entered by the trainer. For example, if the flaps are to be moved to the selected position, the training session data can be analyzed to determine whether the action moved the flaps to the selected position. Additionally, the instructor rating data can be analyzed to determine whether the trainer entered instructor rating data about the movement of the flaps. The instructor rating data can be whether items in a check list were marked, comments made or some combination thereof. A determination is made as to whether the performed action identified from the training corresponds to the instructor rating data entered by the trainer with respect to the action performed (operation 1410).

If the performed action corresponds to the instructor rating data for the action, the process selects the next scenario event (operation 1412). The process then returns to operation 1404. In some cases, the instructor rating data not include a comment entered by the trainer. This lack of comment can be considered a corresponding comment with respect to this process proceeding to select the next scenario event.

With reference again to operation 1410, if the performed action does not correspond to the instructor rating data entered by the trainer, the process identifies whether the performed action was correct or whether the instructor rating data was correct (operation 1414). This determination can be made by the artificial intelligence system comparing the performed action and the instructor rating data to a standard or policy with respect to the event.

With this identification, the process generates an alert (operation 1416). This alert may be, for example, at least one of a graphical indicator indicating that the discrepancy is present, an audio alert, an identification of a keyword to use in revising the comment, a display of a video showing the correct performance of the action, or some other suitable type of information. The alert can be presented to the trainer, placed in a log, sent in a message to a training supervisor, or some other suitable type of alert.

The process then proceeds to operation 1412. This process is performed in real-time during the performance of actions for the training session. In this manner, enhanced feedback can be provided to at least one of the trainer or the trainee.

Thus, more efficient use of a training session can be made with this type of dynamic feedback. For example, if one or more performed actions were incorrect, the event can be repeated during the same training session to more quickly reinforce correct performance of required actions for the event.

Figure 15:
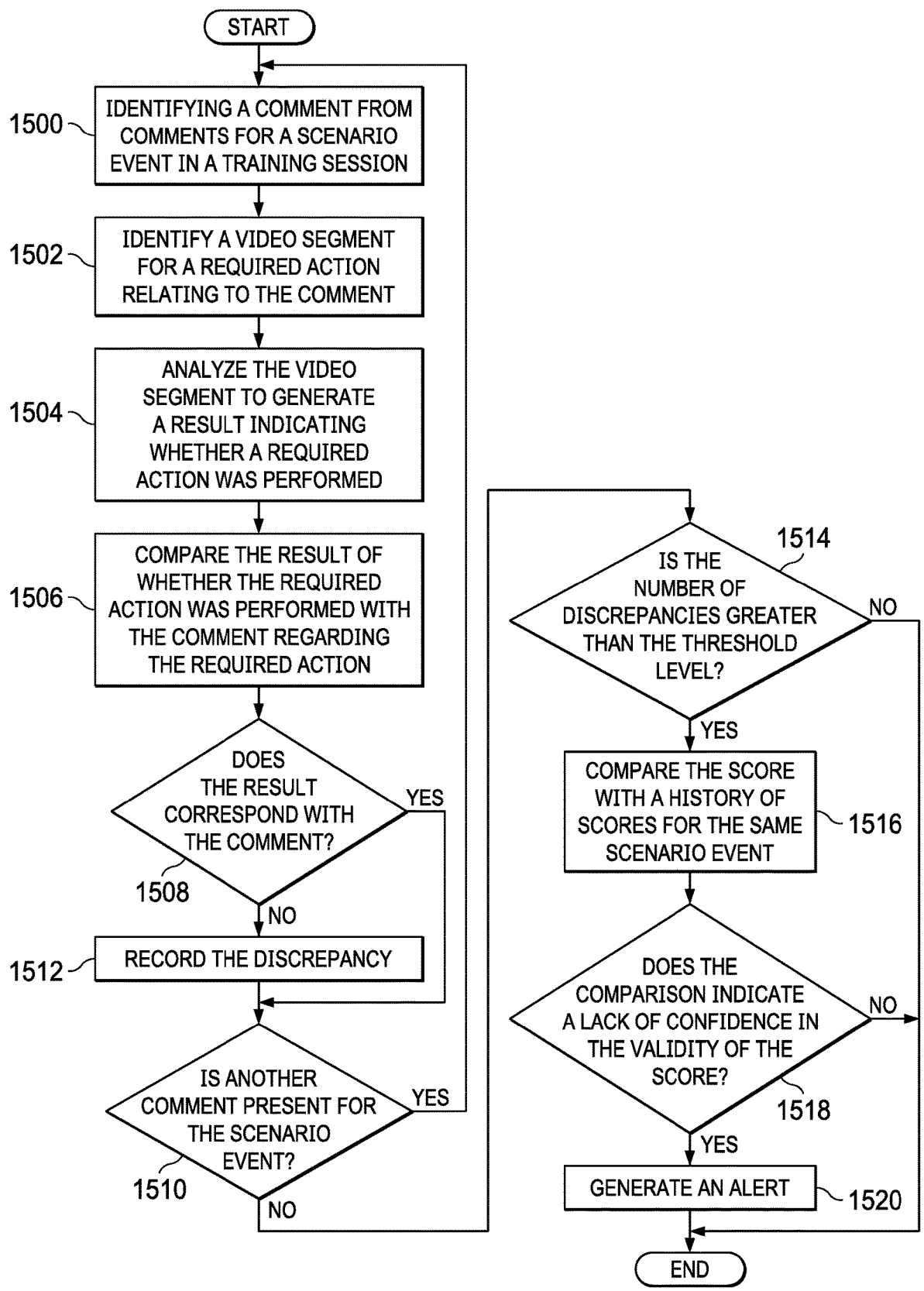
FIG. 15 is an illustration of a flow diagram of a process for analyzing discrepancies between input from a trainer and actions performed by a trainee in accordance with an illustrative embodiment.

In FIG. 15, an illustration of a flow diagram of a process for analyzing discrepancies between input from a trainer on actions and actions performed by a trainee is depicted in accordance with an illustrative embodiment. In this illustrative example, the different operations in the data flow diagram can be implemented in a debriefing module 250 in FIG. 2 utilizing at least one of software or hardware. In this example, the process can be implemented in an artificial intelligence process for the debriefing module 250.

The process begins by identifying a comment from comments for a scenario event in a training session (operation 1500). The process identifies a video segment for a required action relating to the comment (operation 1502). The required action is the action that is to be performed for the scenario event. In this illustrative example, the video segment may be identified based on the association of time stamps with comments as described in the flow diagram in FIG. 11.

The process analyzes the video segment to generate a result indicating whether a required action was performed (operation 1504). The process compares the result of whether the required action was performed with the comment regarding the required action (operation 1506). A determination is made as to whether the result corresponds with the comment (operation 1508).

If the result corresponds with the comment, the process determines whether another comment is present for the scenario event (operation 1510). If another comment is present, the process returns to operation 1500 to identify another comment for processing.

With reference again to operation 1508, if the result does not correspond to the comments, the discrepancy is recorded (operation 1512). The process then proceeds to operation 1510 as described above.

With reference again to operation 1510, if an additional comment is not present, the process determines whether the number of discrepancies is greater than a threshold level (operation 1514). The threshold level may be based on a number of discrepancies that indicates that the scoring may be inaccurate. Further, the threshold level may be based on a history of discrepancies by the trainer in which the number of events with discrepancies is also greater than a threshold that indicates that a bias or the lack of an understanding of the scenario event may be present.

If the number of discrepancies is greater than the threshold level, the process compares the score with a history of scores for the same scenario event (operation 1516). A determination is made as to whether the comparison indicates a lack of confidence in the validity of the score (operation 1518). If a lack of confidence is present, an alert is generated (operation 1520). The process terminates thereafter. The alert may be, for example, an email message, a text message, or a voice message to indicate that a lack of confidence is present in the score. With reference again to operation 1514, if the number of discrepancies is not greater than the threshold level, the process terminates.

With reference again to operation 1518, if a lack of confidence is not present, the process also terminates. This process can be used as an audit to determine whether a trainer is not following the standard or policy set for an event.

In one illustrative example, the video analyzed by the process in FIG. 15 can be a video that was rated by one or more subject matter experts. This type of video may also be referred to as a gold standard video. Then, a rating on the gold standard video could be performed by a trainer and the differences between the trainer's rating and the gold standard rating can be used to determine whether the trainer meets a desired level of competency for the rating practice. This gold standard video can be used to detect inter-rate variability between trainers. Also, an illustrative video of the scenario event could be generated by one or more subject matter experts performing the actions that are normally performed by a trainee for a scenario event. This video could be used as a way to demonstrate to trainers the expected performance from top trainees.

Figure 16:
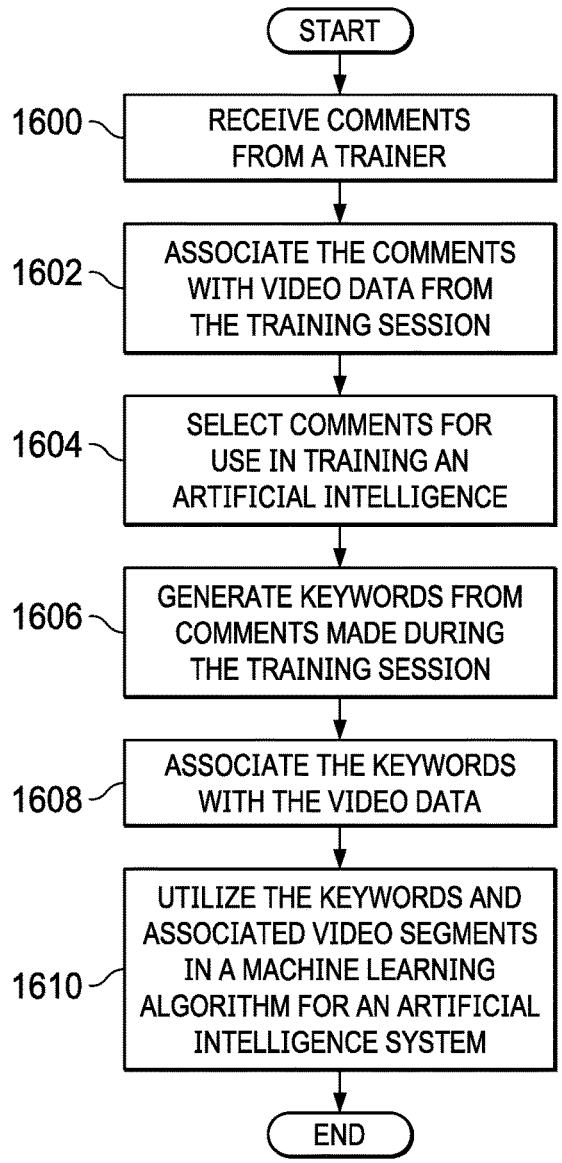
FIG. 16 is an illustration of a flow diagram for training an artificial intelligence system for analyzing comments made by a trainer in a training session in accordance with an illustrative embodiment.

With reference to FIG. 16, an illustration of a flow diagram for training an artificial intelligence system for analyzing comments made by a trainer in a training session is depicted in accordance with an illustrative embodiment. In this illustrative example, the different operations in the data flow diagram can be implemented in an artificial intelligence system that can be located in debriefing module 250 in FIG. 2 or in communication with debriefing module utilizing at least one of software or hardware. This process can be performed to train an artificial intelligence system to evaluate comments made by the trainer in real-time.

The process in this flow diagram can be implemented to train an artificial intelligence system for use as a component in a training rating and debriefing device. For example, the process may be implemented to train an artificial intelligence system that is part of debriefing module 250 or a separate component in communication with debriefing module 250.

During a training session, the process receives comments from a trainer (operation 1600). The comments in operation 1600 are with respect to the performance of a trainee. The process associates the comments with video data from a training session (operation 1602).

In post-processing, the process selects comments for use in training an artificial intelligence (operation 1604). This operation can be performed by subject matter experts analyzing the comments. For example, the comments can be analyzed to identify the comments are appropriate comments for use in training an artificial intelligence system.

The process generates keywords from the comments made during the training session (operation 1606). The process associates the keywords with the video data (operation 1608). The keywords and associated video segments are utilized in a machine learning algorithm for an artificial intelligence system (operation 1610). The process terminates thereafter.

Figure 17:
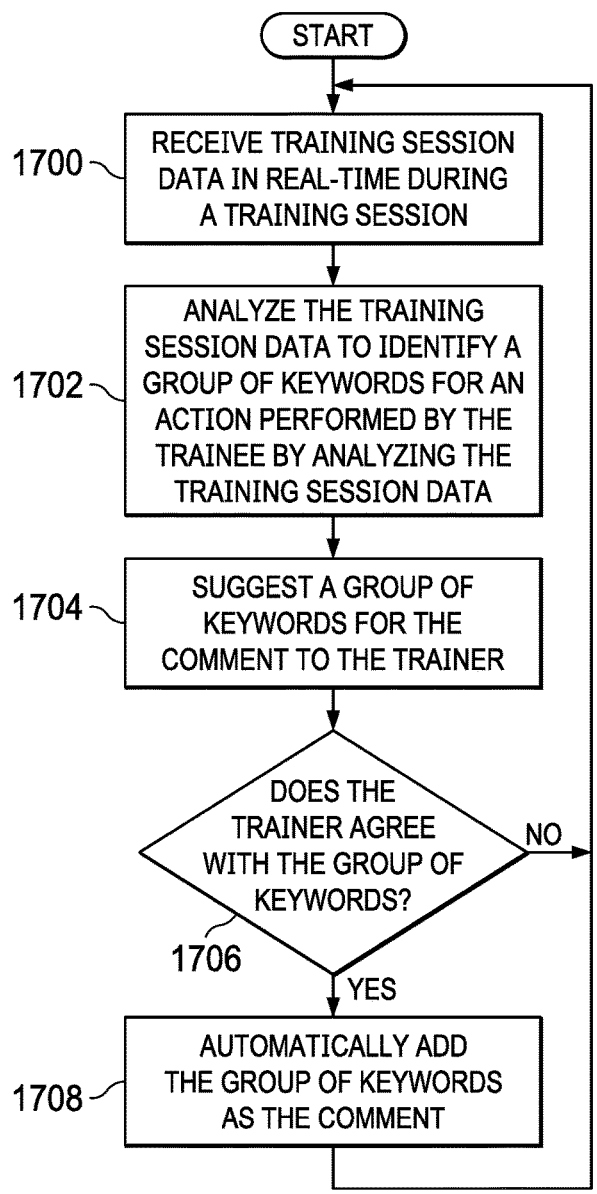
FIG. 17 is an illustration of a flow diagram for analyzing comments made by a trainer during a training session utilizing an artificial intelligence system in accordance with an illustrative embodiment.

With reference to FIG. 17, an illustration of a flow diagram for analyzing comments made by a trainer during a training session utilizing an artificial intelligence system is depicted in accordance with an illustrative embodiment. In this illustrative example, the different operations in the data flow diagram can be implemented in an artificial intelligence system in debriefing module 250 in FIG. 2 utilizing at least one of software or hardware.

The process begins by receiving training session data in real-time during a training session (operation 1700). In this example, the training session data includes video, data from a training device, and other suitable types of data that may be used to analyze comments made by trainer.

The process analyzes the training session data to identify a group of keywords for an action performed by a trainee (operation 1702). In operation 1702, the training session data includes at least one of training device data, emulation data, a video, or other suitable types of data obtained during the training session with respect to the action performed. As used herein, "a group of," when used with reference to items, means one or more items. For example, "a group of keywords" is one or more keywords. The group of keywords are for a comment for the action. The process suggests a group of keywords for the comment to the trainer (operation 1704). In operation 1704, the suggestion can be made by a pop-up window or other graphic indicator in the graphical user interface, such as the graphical user interface 700 in FIG. 7.

A determination is made as to whether the trainer agrees with the group of keywords (operation 1706). If the trainer agrees with the group of keywords, the group of keywords is automatically added as the comment (operation 1708). The process then returns operation 1700 as described above. In analyzing the training session data in real-time, the artificial intelligence system can suggest keywords for use in comments, thus reducing the need for the trainer to enter comments. With reference again to step 1706, if the trainer does not agree with the group of keywords, the process returns to operation 1700 as described above.

The illustration of training and using an artificial intelligence system to analyze actions performed in a video in FIG. 16 and FIG. 17 are provided for purposes of illustrating one manner in which an artificial intelligence system can be used in the different illustrative examples. This illustration is not meant to limit the manner in which an artificial intelligence system can use another example. For example, the artificial intelligence system can also be trained to identify discrepancies between comments made by the trainer for actions performed by a trainee and the actions as analyzed by an artificial intelligence system. In other words, the artificial intelligence system can identify when the comments made by the trainer do not correctly characterize the actions performed by the training based on a standard or other policy defining actions that are to be performed for an event.

Figure 18:
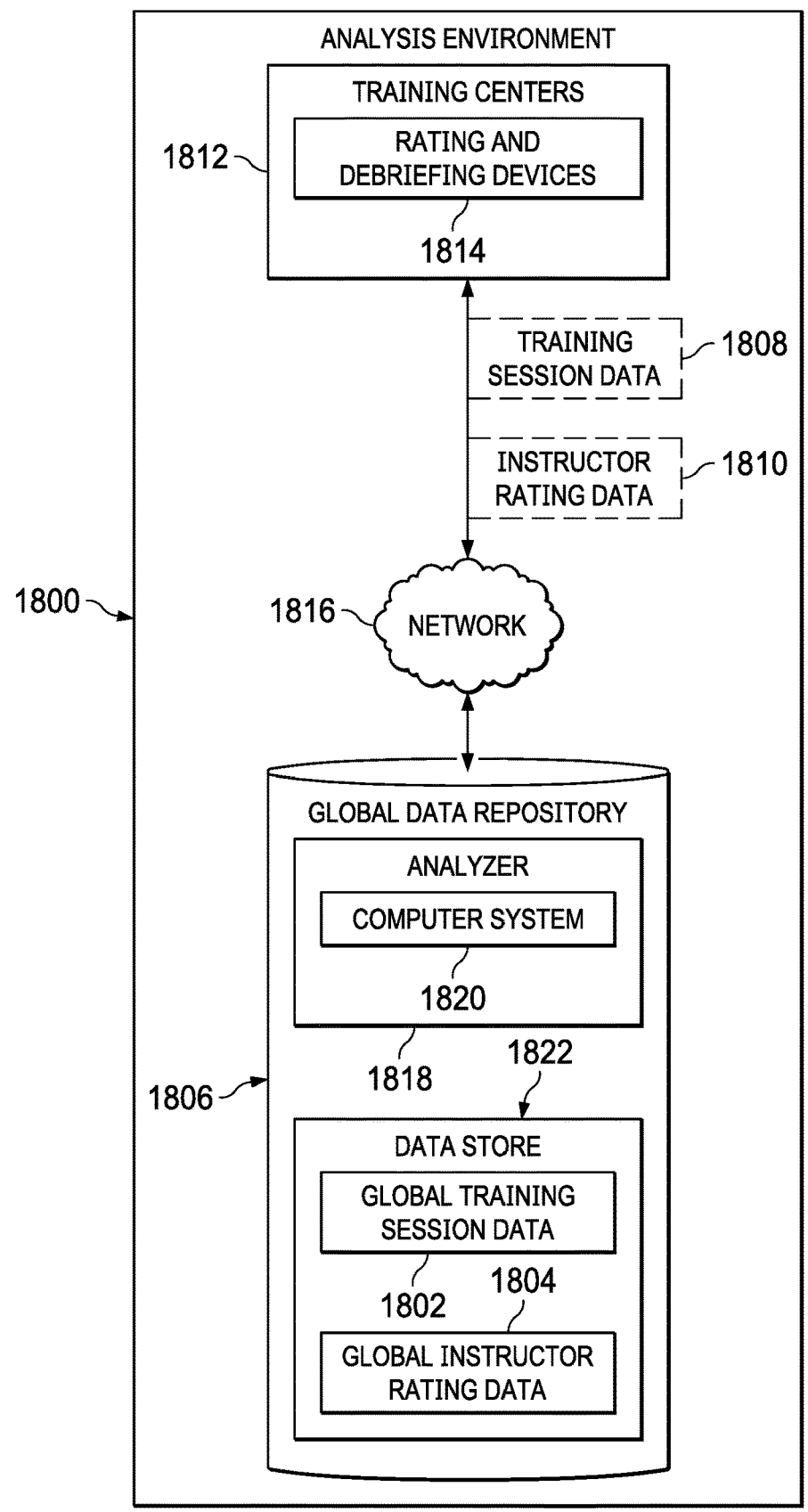
FIG. 18 is an illustration of a block diagram of an analysis environment for analyzing training data in accordance with an illustrative embodiment.

Turning to FIG. 18, an illustration of a block diagram of an analysis environment for analyzing training data is depicted in accordance with an illustrative embodiment. The analysis environment 1800 is an environment in which analysis of training session data 1808 and instructor rating data 1810 can be made.

As depicted, the global training session data 1802 and the global instructor rating data 1804 are stored in a global data repository 1806. As depicted, the global data repository 1806 comprises an analyzer 1818 running on a computer system 1820 and data store 1822. The computer system 1820 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, an electronic flight bag, a mobile phone, or some other suitable data processing system.

As depicted, the analyzer 1818 can be implemented in at least one of hardware or software. The data store 1822 is a storage system that stores global training session data 1802 and global instructor rating data 1804. The data store 1822 is comprised of one or more storage devices that are selected from at least one of a hard disk drive, an optical disk drive, a solid-state disk drive, a tape drive, or other suitable types of storage devices.

In this example, the global data repository 1806 is a repository that receives training session data 1808 and instructor rating data 1810 from training centers 1812. The training centers 1812 can be located in diverse geographic locations. In other words, different training centers can be located in different cities, states, countries, or continents. As depicted, the training session data 1808 and the instructor rating data 1810 can be sent from the training centers 1812 via rating and debriefing devices 1814 located at the training centers 1812.

In this illustrative example, the global data repository 1806 and the rating and debriefing devices 1814 in the training centers 1812 communicate with each other through a network 1816. The network 1816 is comprised of at least one of a local area network, a wide area network, an intranet, the Internet, or some other suitable type of network.

The aggregation of the training session data 1808 and the instructor rating data 1810 into the global training session data 1802 and the global instructor rating data 1804 enables an analyzer 1818 running on the computer system 1820 in the global data repository 1806 to analyze a training program, such as a competency training program, for a particular scenario event or a set of scenario events to be made. For example, the training centers 1812 may be training centers for an airline, an aviation school, or some other organization.

The computer system 1820 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, an electronic flight bag, a mobile phone, or some other suitable data processing system. The analyzer 1818 can be implemented in at least one of hardware or software.

The aggregation of this data may allow for identifying competencies for students at different training centers for a particular school. The analyzer 1818 is configured to determine whether a training center in the training centers 1812 is a statistically lower competency.

In one example, competency that is statistically lower can be for a scenario event. If students at a training center have statistically lower competency for a scenario event than students at other training centers for the same organization, then a further analysis may be made as to whether changes are needed in at least one of the program, instructors, training devices, or other components or procedures in the particular training center.

In another illustrative example, the competency can be, for example, competency across scenario events. The competency could be for communication across the scenario events. For example, in a take-off scenario and a landing scenario, the communication competency in the take-off scenario and a landing scenario can be aggregated as a single communication competency. Since the competencies are not scenario related, all of the competencies can be aggregated between scenario events, similar to the communication example given above. For example, the Standard Operation Procedures across scenario events can also be aggregated since this competency looks into whether the procedures are being followed correctly. These procedures could be take-off checklists, landing checklist and briefings, instrumented landing procedures, and other suitable procedures. Therefore, all International Civil Aviation Organization (ICAO) competencies can be aggregated across scenario events ending up with an overall competency score instead of a scenario based score.

Figure 19:
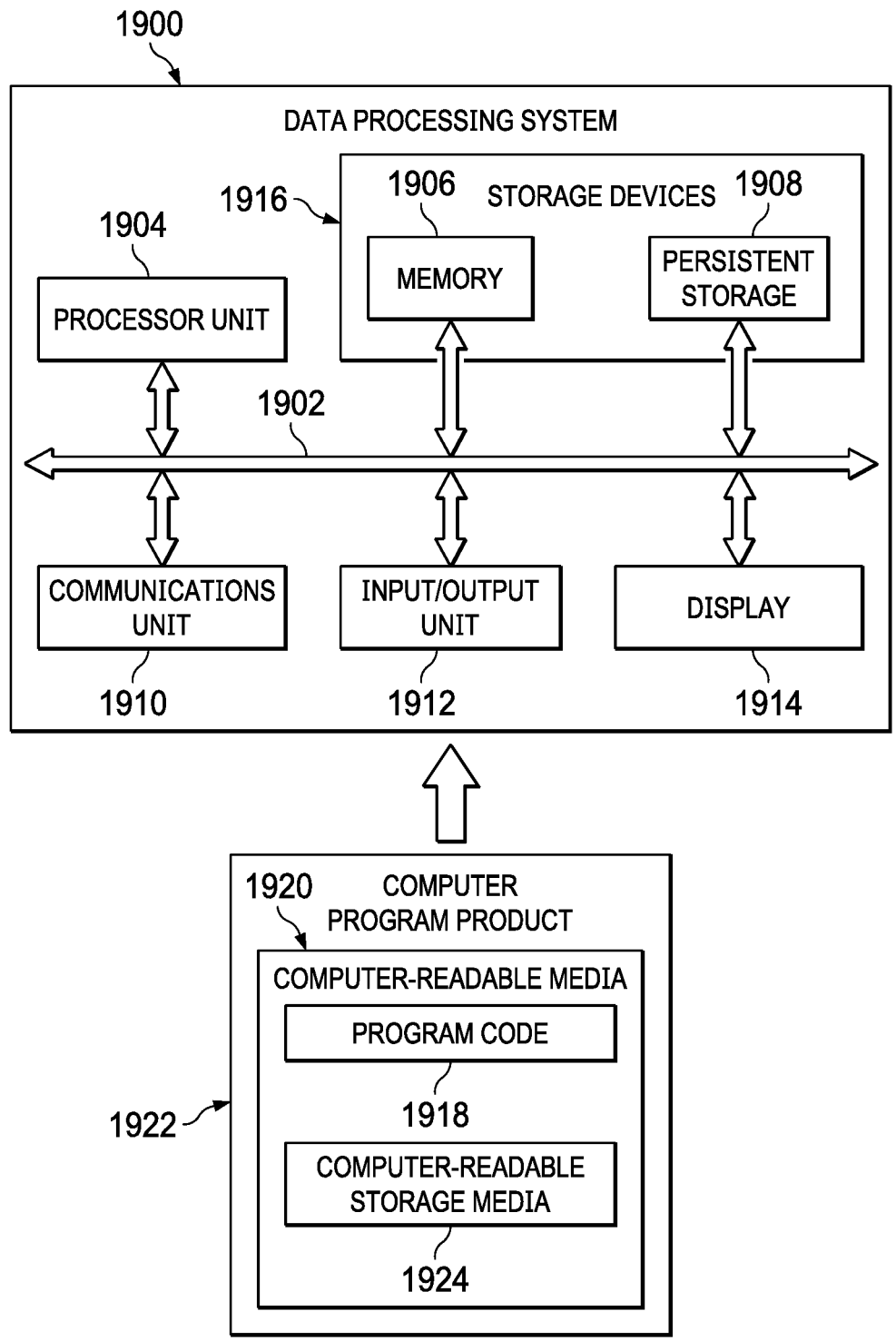
FIG. 19 is an illustration of a block diagram of a data processing system in accordance with an illustrative embodiment.

Turning now to FIG. 19, an illustration of a block diagram of a data processing system is depicted in accordance with an illustrative embodiment. The data processing system 1900 may be used to implement at least one of a training device 120 in FIG. 1 and in FIG. 2, a computer system 1004 in FIG. 10, a computer system 1820 in FIG. 18, a rating and briefing device 100 in FIG. 1 and in FIG. 4, a rating and briefing device 1012 in FIG. 10, rating and briefing devices 1814 in FIG. 18, or other suitable devices. In this illustrative example, the data processing system 1900 includes a communications framework 1902, which provides communications between a processor unit 1904, a memory 1906, a persistent storage 1908, a communications unit 1910, an input/output (I/O) unit 1912, and a display 1914. In this example, the communication framework 1902 may take the form of a bus system.

The processor unit 1904 executes instructions for software that may be loaded into the memory 1906. The processor unit 1904 may be a number of processors, a multi-processor core, or some other type of processor, depending on the particular implementation. Processor unit 104 is an example of a hardware device that may be used in the processor 200 in FIG. 2.

The memory 1906 and the persistent storage 1908 are examples of storage devices 1916. A storage device is any piece of hardware that is capable of storing information, such as, for example, without limitation, at least one of data, program code in functional form, or other suitable information either on a temporary basis, a permanent basis, or both on a temporary basis and a permanent basis. The storage devices 1916 may also be referred to as computer readable storage devices in these illustrative examples. Memory 1906, in these examples, may be, for example, a random-access memory or any other suitable volatile or non-volatile storage device. The persistent storage 1908 may take various forms, depending on the particular implementation.

For example, the persistent storage 1908 may contain one or more components or devices. For example, the persistent storage 1908 may be a hard drive, a solid state hard drive, a flash memory, a rewritable optical disk, a rewritable magnetic tape, or some combination of the above. The media used by the persistent storage 1908 also may be removable. For example, a removable hard drive may be used for persistent storage 1908.

The communications unit 1910, in these illustrative examples, provides for communications with other data processing systems or devices. In these illustrative examples, the communications unit 1910 is a network interface card (NIC).

The input/output unit 1912 allows for input and output of data with other devices that may be connected to the data processing system 1900. For example, the input/output unit 1912 may provide a connection for user input through at least one of a keyboard, a mouse, or some other suitable input device. Further, the input/output unit 1912 may send output to a printer. The display 1914 provides a mechanism to display information to a user.

Instructions for at least one of the operating system, applications, or programs may be located in storage devices 1916, which are in communication with the processor unit 1904 through the communications framework 1902. The processes of the different embodiments may be performed by the processor unit 1904 using computer-implemented instructions, which may be located in a memory 1906.

These instructions are referred to as program code, computer usable program code, or computer readable program code that may be read and executed by a processor in the processor unit 1904. The program code in the different embodiments may be embodied on different physical or computer readable storage media, such as the memory 1906 or the persistent storage 1908.

The program code 1918 is located in a functional form on a computer readable media 1920 that is selectively removable and may be loaded onto or transferred to the data processing system 1900 for execution by the processor unit 1904. The program code 1918 and the computer readable media 1920 form the computer program product 1922 in these illustrative examples. In one example, the computer readable media 1920 is a computer readable storage media 1924.

In these illustrative examples, the computer readable storage media 1924 is a physical or tangible storage device used to store program code 1918 rather than a medium that propagates or transmits program code 1918.

Alternatively, the program code 1918 may be transferred to the data processing system 1900 using a computer readable signal media. The computer readable signal media may be, for example, a propagated data signal containing the program code 1918. For example, the computer readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1900 are not meant to provide architectural limitations to the manner in which different embodiments may be implemented. The different illustrative embodiments may be implemented in a data processing system including components in addition to or in place of those illustrated for the data processing system 1900. Other components shown in FIG. 19 can be varied from the illustrative examples shown. The different embodiments may be implemented using any hardware device or system capable of running the program code 1918.

Thus, the present disclosure refers to an electronic device for rating and debriefing evidence-based training sessions. The device allows the instructor to extract and rate crew behaviors from the training session in a structured fashion in order to directly relate them to the competencies being trained by Evidence-Based Training (EBT), the new industry standard. To minimize inter-rater variability when analyzing the set of behaviors part of the competency, a pre-defined list of scenario events and expected actions can be provided when inputting instructor comments. The device can integrate the video and data recording which is time-stamped when a comment is recorded to facilitate debriefing.

The rating and debriefing electronic device comprises a communications module for acquiring real-time training session data during a training session of a trainee; a real-time data acquisition module configured for generating time-stamped training session data; an input unit for acquiring instructor rating data input by an instructor during the training session; a real-time instructor rating module configured for generating time-stamped instructor rating data; a storing module configured for storing real-time data of the training session in a data repository, wherein the real-time data includes the time-stamped training session data and the time-stamped instructor rating data; and a debriefing module configured to retrieve real-time data of a training session from the data repository, replay the real-time data on a display, and update the instructor rating data in the data repository with updated instructor rating data received from an instructor during the replay.

The electronic device may also comprise a post-session assessment module configured to replay instructor rating data of a training session stored on the data repository, and generate an instructor assessment for the training session based on a competency assessment received from an instructor during the replay. In an embodiment, the electronic device comprises a final assessment module configured to generate a final instructor assessment for a training session based on a final rating input by an instructor.

The electronic device may be implemented, for instance, in a mobile device, a desktop computer, or a workstation. According to an embodiment, the training session data includes training device data obtained from a training device; and video data obtained from a video camera recording the trainee during execution of the training session. In this embodiment, the debriefing module may be configured to integrate time-stamped instructor rating data with video data of the training session for the replay of real-time data of a training session.

In accordance with a further aspect of the present disclosure, there is also provided a system for rating and debriefing evidence-based training sessions, comprising an electronic device as previously described, and a video camera for recording the trainee during execution of a training session in a training device. The system may also comprise the training device, implemented as a flight simulator, a desktop simulation, or a videogame.

In accordance with yet a further aspect of the present disclosure, there is provided a computer-implemented method for rating and debriefing evidence-based training sessions. The method comprises the following steps:

Acquiring real-time training session data during a training session of a trainee and generate time-stamped training session data.

Acquiring instructor rating data input by an instructor during the training session and generate time-stamped instructor rating data.

Storing real-time data of the training session in a data repository, wherein the real-time data includes the time-stamped training session data and the time-stamped instructor rating data.

Retrieving real-time data of a training session from the data repository and replay the real-time data on a display.

Updating the instructor rating data in the data repository with updated instructor rating data received from an instructor during the replay.

The method may also comprise generating an instructor assessment for the training session based on a competency assessment received from an instructor. In an embodiment, the method further comprises generating a final instructor assessment for a training session based on a final rating input by an instructor.

According to an embodiment, the training session data includes training device data obtained from a training device and video data obtained from a video camera recording the trainee during execution of the training session. The method may comprise integrating time-stamped instructor rating data with video data of the training session for replaying the real-time data on a display.

In accordance with another aspect of the present invention, there is provided a computer program product for rating and debriefing evidence-based training sessions, comprising computer code instructions that, when executed by a processor, causes the processor to perform the previously described method. The computer program product may comprise at least one computer-readable storage medium having recorded thereon the computer code instructions.

The implementation of an EBT training according to the present disclosure allows instructors to evaluate flight crews in a guided, objective, and consistent way. By providing a selection of scenario events and the associated desired flight crew actions (for pre-defined training sessions) and/or the behavioral indicators, instructors receive the necessary guidance for effective, repeatable rating. Furthermore, the linking of the behavioral rating with a free-text comment as well as integration with a time-stamped video stream whenever a comment or rating is recorded, creates an immersive debriefing experience that enhances the learning effect for the students, facilitates the evaluation made by the instructor, and completely replaces paper-based processes for student assessment.

Electronically acquiring the training data, instead of using a paper-based process, allows direct access to competency overviews after the session (quantitative), sorting and addressing the instructor comments by competency, making possible a data-based, more objective performance assessment. Also, the intuitive access to video and simulation data greatly assists the debriefing effectiveness. An automatic selection of debriefing topics based on highlighted items as well as observations related to a competency which was rated below standard, further improves the debriefing performance of the instructor. Additionally, storing all the training information in an electronic format facilitates the transition to fully paperless recordkeeping with all its advantages, including training quality assurance and auditability.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. For example, the trainee can be at least one of a student pilot or a student trainer. With a student trainer, the video and also include the student trainee for use in analyzing the manner in which the student trainee performs in a training session. The comments made by the trainer focus on actions performed by the student trainee with this type of implementation. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A training system that comprises a device that comprises:
   a communications module configured to acquire training session data in real-time during a training session of a trainee, wherein the training session data comprises: training device data generated in real time by a training device, and video data generated in real time by a camera in the training device;
   a real-time data acquisition module configured to generate time-stamped training session data from the training session data;
   an input unit configured to acquire instructor rating data input by an instructor during the training session;
   a real-time instructor rating module configured to generate time-stamped instructor rating data;
   a storing module configured to store the training session data in a data repository, wherein the training session data includes the time-stamped training session data and the time-stamped instructor rating data;
   a debriefing module configured to:
      integrate the time-stamped training session data the time-stamped instructor rating data; and
      display a graphical user interface on a display with a list of comments, display a selected comment selected by user input and display a link for a video segment associated with the selected comment from comments associated with time stamps in the time-stamped instructor rating data and video associated with time stamps in the time-stamped training session data; and
   an artificial intelligence system configured to:
      analyze the training session data:
      record and display, based upon the training device data generated by the training device, a checklist box comprising completed actions required for the training session; and
      analyze real-time instructor rating data as the time-stamped training session data is received.

2. The training system of claim 1, wherein the artificial intelligence system is configured to identify a sequence of required actions for a scenario event; identify a sequence of performed actions from the time-stamped training session data; determine whether the sequence of performed actions matches the sequence of required actions; and indicate a pass if a match is present.

3. The training system of claim 2, wherein the artificial intelligence system is configured to determine whether the sequence of performed actions matches the sequence of required actions after the training session is completed.

4. The training system of claim 2, wherein the artificial intelligence system is configured to determine whether the sequence of performed actions matches the sequence of required actions in real-time during the training session.

5. The training system of claim 2, wherein the artificial intelligence system is configured to determine whether a required action was performed as commented on by a trainer and generate an alert if the required action was not performed as commented on by the trainer.

6. The training system of claim 2, wherein the artificial intelligence system is configured to access global training session data and global instructor rating data received from training centers, and identify whether a training center in the training centers has a statistically lower competency for the scenario event.

7. The training system of claim 2, wherein the artificial intelligence system is configured to identify a group of keywords for an action performed by the trainee by analyzing the time-stamped training session data, wherein the group of keywords is for a comment for the action.

8. The training system of claim 1, wherein the artificial intelligence system is located in at least one of the debriefing module or a computer system in communication with the debriefing module.

9. The training system of claim 1, wherein the communications module, the real-time data acquisition module, the input unit, the real-time instructor rating module, the storing module, and the debriefing module are located in a rating and briefing device.

10. The training system of claim 9 further comprising: a video camera.

11. The training system of claim 1, wherein the time-stamped training session data comprises the training device data and the video data.

12. An electronic device for debriefing evidence-based training sessions, the electronic device comprising:
   a communications module configured to acquire training session data in real time during a training session of a trainee, such that the training session data comprises video data;
   a real-time data acquisition module configured to generate time-stamped training session data;
   an input unit configured to acquire instructor rating data input during the training session;
   a real-time instructor rating module configured to:
      generate time-stamped instructor rating data;
      retrieve a checklist box that comprises actions to be performed during a pre-defined scenario event;
      analyze training device data generated by a training device;
      based on an analysis of the training device data generated by the training device, automatically check in the checklist box execution of at least one action performed during the training session; and
      provide real-time feedback on a graphical user interface regarding the execution of the at least one action;

a storing module configured to store real-time data of the training session in a data repository, such that the training session data of the training session comprises the time-stamped training session data and the time-stamped instructor rating data; and a debriefing module configured to:
retrieve real-time data of the training session from the data repository;
integrate the time-stamped instructor rating data with the video data of the training session to form integrated data; and
replay the integrated data on a display; and update the time-stamped instructor rating data in the data repository with updated instructor rating data received during the replay of the integrated data on the display.

13. The electronic device of claim 12, further comprising a post-session assessment module configured to replay instructor rating data of the training session stored on the data repository, and generate an instructor assessment for the training session based on a competency assessment received from an instructor during the replay.

14. The electronic device of claim 12 further comprising:
a final assessment module configured to generate a final instructor assessment for the training session based on a final rating input by an instructor.

15. The electronic device of claim 12, wherein the electronic device is a mobile device, a desktop computer or a workstation.

16. The electronic device of claim 12, wherein the video data is obtained from a video camera recording the trainee during execution of the training session.

17. The electronic device of claim 12, wherein the video data is obtained from the training device recording an execution of the training session.

18. The electronic device of claim 12, further comprising an artificial intelligence system, wherein the artificial intelligence system is configured to analyze the training session data and the instructor rating data in real-time as the training session data is received from the training device.

19. The electronic device of claim 18, wherein the artificial intelligence system is configured to identify a sequence of required actions for a scenario event; identify a sequence of performed actions from the training session data; determine whether the sequence of performed actions match the sequence of required actions; and indicate a pass if a match is present.

20. The electronic device of claim 19, wherein the artificial intelligence system is configured to determine whether the sequence of performed actions match the sequence of required actions after the training session is completed.

21. The electronic device of claim 19, wherein the artificial intelligence system is configured to determine whether the sequence of performed actions matches the sequence of required actions in real-time during the training session.

22. The electronic device of claim 19, wherein the artificial intelligence system is configured to identify a group of keywords for an action by analyzing the training session data, wherein the group of keywords is for a comment for the action.

23. A computer-implemented method for debriefing evidence-based training sessions, the method comprising:
acquiring training session data in real time during a training session of a trainee, the training session data comprising training device data generated in real time by a training device and video data generated by a camera in the training device;
generating time-stamped training session data from training session data;
acquiring instructor rating data during the training session and generating time-stamped instructor rating data;
storing real-time data of the training session in a data repository, the real-time data comprising the time-stamped training session data and the time-stamped instructor rating data;
retrieving training session data of a training session from the data repository;
forming integrated data via integrating the time-stamped instructor rating data with the video data of the training session;
replaying the integrated data on a display;
updating the instructor rating data in the data repository with updated instructor rating data received from an instructor during the replay; and
a real-time instructor rating module for:
retrieving a checklist box comprising actions to be performed during a pre-defined scenario event; and
interfacing with an artificial intelligence analyzing the training device data generated by the training device automatically checking execution in the checklist box of at least one action performed during the training session; and
providing real-time feedback to the instructor regarding the execution of said at least one action.

24. The computer-implemented method of claim 23, further comprising generating an instructor assessment for the training session based on a competency assessment received from the instructor.

25. The computer-implemented method of claim 23, further comprising:
generating a final instructor assessment for a training session based on a final rating input by the instructor.

* * * * *